United States Patent [19]
Row et al.

[11] Patent Number: 5,355,453
[45] Date of Patent: * Oct. 11, 1994

[54] PARALLEL I/O NETWORK FILE SERVER ARCHITECTURE

[75] Inventors: Edward J. Row, Mountain View; Laurence B. Boucher, Saratoga; William M. Pitts, Los Altos; Stephen E. Blightman, San Jose, all of Calif.

[73] Assignee: Auspex Systems, Inc., Santa Clara, Calif.

[ * ] Notice: The portion of the term of this patent subsequent to Nov. 10, 2009 has been disclaimed.

[21] Appl. No.: 959,746

[22] Filed: Oct. 13, 1992

Related U.S. Application Data

[63] Continuation of Ser. No. 404,959, Sep. 8, 1989, Pat. No. 5,163,131.

[51] Int. Cl.⁵ .................. G06F 15/16; G06F 13/00
[52] U.S. Cl. ..................... 395/200; 364/DIG. 1; 364/242.4; 364/228.3; 364/234; 364/284.4; 364/243.4; 364/230
[58] Field of Search ................ 395/200, 650, 700, 800

[56] References Cited

U.S. PATENT DOCUMENTS

| | | |
|---|---|---|
| 4,075,691 | 2/1978 | Davis et al. ............ 364/200 |
| 4,156,907 | 4/1979 | Rawlings et al. ............ 364/200 |
| 4,333,144 | 6/1982 | Whiteside et al. ............ 364/200 |
| 4,377,843 | 3/1983 | Garringer et al. ............ 364/200 |
| 4,399,503 | 8/1983 | Hawley ............ 364/200 |
| 4,456,457 | 6/1984 | Schieltz ............ 364/200 |
| 4,459,664 | 7/1984 | Pottier et al. ............ 364/200 |
| 4,488,231 | 12/1984 | Yu et al. ............ 364/200 |
| 4,527,232 | 7/1985 | Bechtolsheim ............ 364/200 |
| 4,550,368 | 10/1985 | Bechtolsheim ............ 364/200 |
| 4,685,125 | 8/1987 | Zave ............ 364/200 |
| 4,710,868 | 12/1987 | Cocke et al. ............ 364/200 |
| 4,719,569 | 1/1988 | Ludemann et al. ............ 364/200 |
| 4,766,534 | 8/1988 | DeBenedictis ............ 364/200 |
| 4,780,821 | 10/1988 | Crossley ............ 364/200 |
| 4,783,730 | 11/1988 | Fischer ............ 364/200 |
| 4,803,621 | 2/1989 | Kelly ............ 364/200 |
| 4,819,159 | 4/1989 | Shipley et al. ............ 364/200 |
| 4,825,354 | 7/1989 | Lighthart et al. ............ 364/200 |
| 4,887,204 | 12/1989 | Johnson et al. ............ 364/200 |
| 4,897,781 | 1/1990 | Chang et al. ............ 364/200 |
| 4,914,583 | 4/1990 | Weisshaar et al. ............ 364/200 |

FOREIGN PATENT DOCUMENTS

0321723A2  6/1989  European Pat. Off. ..... G06F 15/16
WO 89/03086  4/1989  World Int. Prop. O. ... G06F 15/16

OTHER PUBLICATIONS

Osadzinski, Alex, "The Network File System (NFS)", 8202 Computer Standards & Interfaces, 8 (1988/89) No. 1, pp. 45-48, Amsterdam, The Netherlands.
Tannebaum, Andrew S., "Computer Networks" (1988), 2nd Edition, Prentice Hall, pp. 35, 36, Chap. 9.
IEEE Computer, "I/O subsystem", Sep. 1988, pp. 23-25 and 106.
Carlson, et al., "HP AdvanceNet: A Growth-Oriented Computer Networking Architectural Strategy", Hewlett-Packard Journal (Oct. 1986), p. 2, pp. 6-10.
Tribby, David M., "Network Services for HP Real-Time Computers", Hewlett-Packard Journal (Oct. 1986), pp. 22-27.
Motorola, Inc., Microsystems Products Technical Data Sheet (1986), microMAP1-7, "MicroMAP Manufacturing Automation Protocol Software".

Primary Examiner—Kevin A. Kriess
Attorney, Agent, or Firm—Fliesler, Dubb, Meyer & Lovejoy

[57] ABSTRACT

A file server architecture is disclosed, comprising as separate processors, a network controller unit, a file controller unit and a storage processor unit. These units incorporate their own processors, and operate in parallel with a local Unix host processor. All networks are connected to the network controller unit, which performs all protocol processing up through the NFS layer. The virtual file system is implemented in the file control unit, and the storage processor provides high-speed multiplexed access to an array of mass storage devices. The file controller unit control file information caching through its own local cache buffer, and controls disk data caching through a large system memory which is accessible on a bus by any of the processors.

38 Claims, 12 Drawing Sheets

(FILE CONTROLLER)

FIG.-4 (FILE CONTROLLER)

PARALLEL I/O NETWORK FILE SERVER ARCHITECTURE

CROSS-REFERENCE TO RELATED APPLICATIONS

This application is a continuation of U.S. patent application Ser. No. 07/404,959, filed Sep. 8, 1989 now U.S. Pat. No. 5,163,131.

The present application is related to the following U.S. Patent Applications, all filed concurrently herewith:

1. MULTIPLE FACILITY OPERATING SYSTEM ARCHITECTURE, invented by David Hitz, Allan Schwartz, James Lau and Guy Harris;
2. ENHANCED VMEBUS PROTOCOL UTILIZING PSEUDOSYNCHRONOUS HANDSHAKING AND BLOCK MODE DATA TRANSFER, invented by Daryl Starr; and
3. BUS LOCKING FIFO MULTI-PROCESSOR COMMUNICATIONS SYSTEM UTILIZING PSEUDOSYNCHRONOUS HANDSHAKING AND BLOCK MODE DATA TRANSFER invented by Daryl D. Starr, William Pitts and Stephen Blightman.

The above applications are all assigned to the assignee of the present invention and are all expressly incorporated herein by reference.

BACKGROUND OF THE INVENTION

1. Field of the Invention

The invention relates to computer data networks, and more particularly, to network file server architectures for computer networks.

2. Description of the Related Art

Over the past ten years, remarkable increases in hardware price/performance ratios have caused a startling shift in both technical and office computing environments. Distributed workstation-server networks are displacing the once pervasive dumb terminal attached to mainframe or minicomputer. To date, however, network I/O limitations have constrained the potential performance available to workstation users. This situation has developed in part because dramatic jumps in microprocessor performance have exceeded increases in network I/O performance.

In a computer network, individual user workstations are referred to as clients, and shared resources for filing, printing, data storage and wide-area communications are referred to as servers. Clients and servers are all considered nodes of a network. Client nodes use standard communications protocols to exchange service requests and responses with server nodes.

Present-day network clients and servers usually run the DOS, Macintosh OS, OS/2, or Unix operating systems. Local networks are usually Ethernet or Token Ring at the high end, Arcnet in the midrange, or LocalTalk or StarLAN at the low end. The client-server communication protocols are fairly strictly dictated by the operating system environment—usually one of several proprietary schemes for PCs (NetWare, 3Plus, Vines, LANManager, LANServer); AppleTalk for Macintoshes; and TCP/IP with NFS or RFS for Unix. These protocols are all well-known in the industry.

Unix client nodes typically feature a 16- or 32-bit microprocessor with 1-8 MB of primary memory, a 640×1024 pixel display, and a built-in network interface. A 40-100 MB local disk is often optional. Low-end examples are 80286-based PCs or 68000-based Macintosh I's; mid-range machines include 80386 PCs, Macintosh II's, and 680X0-based Unix workstations; high-end machines include RISC-based DEC, HP, and Sun Unix workstations. Servers are typically nothing more than repackaged client nodes, configured in 19-inch racks rather than desk sideboxes. The extra space of a 19-inch rack is used for additional backplane slots, disk or tape drives, and power supplies.

Driven by RISC and CISC microprocessor developments, client workstation performance has increased by more than a factor of ten in the last few years. Concurrently, these extremely fast clients have also gained an appetite for data that remote servers are unable to satisfy. Because the I/O shortfall is most dramatic in the Unix environment, the description of the preferred embodiment of the present invention will focus on Unix file servers. The architectural principles that solve the Unix server I/O problem, however, extend easily to server performance bottlenecks in other operating system environments as well. Similarly, the description of the preferred embodiment will focus on Ethernet implementations, though the principles extend easily to other types of networks.

In most Unix environments, clients and servers exchange file data using the Network File System ("NFS"), a standard promulgated by Sun Microsystems and now widely adopted by the Unix community. NFS is defined in a document entitled, "NFS: Network File System Protocol Specification," Request For Comments (RFC) 1094, by Sun Microsystems, Inc. (March 1989). This document is incorporated herein by reference in its entirety.

While simple and reliable, NFS is not optimal. Clients using NFS place considerable demands upon both networks and NFS servers supplying clients with NFS data. This demand is particularly acute for so-called diskless clients that have no local disks and therefore depend on a file server for application binaries and virtual memory paging as well as data. For these Unix client-server configurations, the ten-to-one increase in client power has not been matched by a ten-to-one increase in Ethernet capacity, in disk speed, or server disk-to-network I/O throughput.

The result is that the number of diskless clients that a single modern high-end server can adequately support has dropped to between 5-10, depending on client power and application workload. For clients containing small local disks for applications and paging, referred to as dataless clients, the client-to-server ratio is about twice this, or between 10-20.

Such low client/server ratios cause piecewise network configurations in which each local Ethernet contains isolated traffic for its-own 5-10 (diskless) clients and dedicated server. For overall connectivity, these local networks are usually joined together with an Ethernet backbone or, in the future, with an FDDI backbone. These backbones are typically connected to the local networks either by IP routers or MAC-level bridges, coupling the local networks together directly, or by a second server functioning as a network interface, coupling servers for all the local networks together.

In addition to performance considerations, the low client-to-server ratio creates computing problems in several additional ways:

1. Sharing. Development groups of more than 5-10 people cannot share the same server, and thus cannot easily share files without file replication and manual, multi-server updates. Bridges or routers are a partial solution but inflict a performance penalty due to more network hops.

2. Administration. System administrators must maintain many limited-capacity servers rather than a few more substantial servers. This burden includes network administration, hardware maintenance, and user account administration.

3. File System Backup. System administrators or operators must conduct multiple file system backups, which can be onerously time consuming tasks. It is also expensive to duplicate backup peripherals on each server (or every few servers if slower network backup is used).

4. Price Per Seat. With only 5-10 clients per server, the cost of the server must be shared by only a small number of users. The real cost of an entry-level Unix workstation is therefore significantly greater, often as much as 140% greater, than the cost of the workstation alone.

The widening I/O gap, as well as administrative and economic considerations, demonstrates a need for higher-performance, larger-capacity Unix file servers. Conversion of a display-less workstation into a server may address disk capacity issues, but does nothing to address fundamental I/O limitations. As an NFS server, the one-time workstation must sustain 5-10 or more times the network, disk, backplane, and file system throughput than it was designed to support as a client. Adding larger disks, more network adaptors, extra primary memory, or even a faster processor do not resolve basic architectural I/O constraints; I/O throughput does not increase sufficiently.

Other prior art computer architectures, while not specifically designed as file servers, may potentially be used as such. In one such well-known architecture, a CPU, a memory unit, and two I/O processors are connected to a single bus. One of the I/O processors operates a set of disk drives, and if the architecture is to be used as a server, the other I/O processor would be connected to a network. This architecture is not optimal as a file server, however, at least because the two I/O processors cannot handle network file requests without involving the CPU. All network file requests that are received by the network I/O processor are first transmitted to the CPU, which makes appropriate requests to the disk-I/O processor for satisfaction of the network request.

In another such computer architecture, a disk controller CPU manages access to disk drives, and several other CPUs, three for example, may be clustered around the disk controller CPU. Each of the other CPUs can be connected to its own network. The network CPUs are each connected to the disk controller CPU as well as to each other for interprocessor communication. One of the disadvantages of this computer architecture is that each CPU in the system runs its own complete operating system. Thus, network file server requests must be handled by an operating system which is also heavily loaded with facilities and processes for performing a large number of other, non file-server tasks. Additionally, the interprocessor communication is not optimized for file server type requests.

In yet another computer architecture, a plurality of CPUs, each having its own cache memory for data and instruction storage, are connected to a common bus with a system memory and a disk controller. The disk controller and each of the CPUs have direct memory access to the system memory, and one or more of the CPUs can be connected to a network. This architecture is disadvantageous as a file server because, among other things, both file data and the instructions for the CPUs reside in the same system memory. There will be instances, therefore, in which the CPUs must stop running while they wait for large blocks of file data to be transferred between system memory and the network CPU. Additionally, as with both of the previously described computer architectures, the entire operating system runs on each of the CPUs, including the network CPU.

In yet another type of computer architecture, a large number of CPUs are connected together in a hypercube topology. One of more of these CPUs can be connected to networks, while another can be connected to disk drives. This architecture is also disadvantageous as a file server because, among other things, each processor runs the entire operating system. Interprocessor communication is also not optimal for file server applications.

SUMMARY OF THE INVENTION

The present invention involves a new, server-specific I/O architecture that is optimized for a Unix file server's most common actions—file operations. Roughly stated, the invention involves a file server architecture comprising one or more network controllers, one or more file controllers, one or more storage processors, and a system or buffer memory, all connected over a message passing bus and operating in parallel with the Unix host processor. The network controllers each connect to one or more network, and provide all protocol processing between the network layer data format and an internal file server format for communicating client requests to other processors in the server. Only those data packets which cannot be interpreted by the network controllers, for example client requests to run a client-defined program on the server, are transmitted to the Unix host for processing. Thus the network controllers, file controllers and storage processors contain only small parts of an overall operating system, and each is optimized for the particular type of work to which it is dedicated.

Client requests for file operations are transmitted to one of the file controllers which, independently of the Unix host, manages the virtual file system of a mass storage device which is coupled to the storage processors. The file controllers may also control data buffering between the storage processors and the network controllers, through the system memory. The file controllers preferably each include a local buffer memory for caching file control information, separate from the system memory for caching file data. Additionally, the network controllers, file processors and storage processors are all designed to avoid any instruction fetches from the system memory, instead keeping all instruction memory separate and local. This arrangement eliminates contention on the backplane between microprocessor instruction fetches and transmissions of message and file data.

BRIEF DESCRIPTION OF THE DRAWINGS

The invention will be described with respect to particular embodiments thereof, and reference will be made to the drawings, in which.

DETAILED DESCRIPTION

Figure 1:
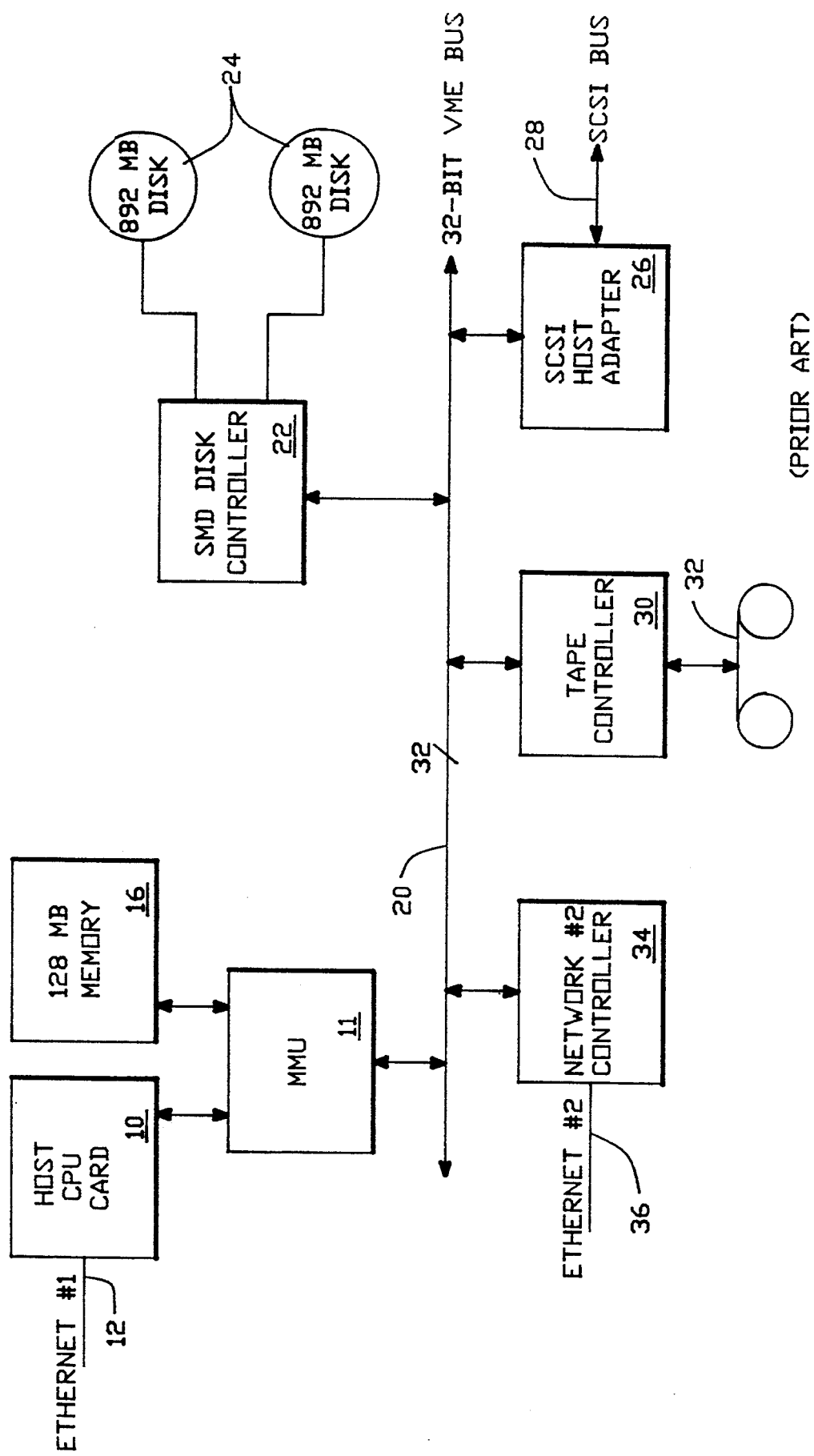
FIG. 1 is a block diagram of a prior art file server architecture.

For comparison purposes and background, an illustrative prior-art file server architecture will first be described with respect to FIG. 1. FIG. 1 is an overall block diagram of a conventional prior-art Unix-based file server for Ethernet networks. It consists of a host CPU card 10 with a single microprocessor on board. The host CPU card 10 connects to an Ethernet #1 12, and it connects via a memory management unit (MMU) 11 to a large memory array 16. The host CPU card 10 also drives a keyboard, a video display, and two RS232 ports (not shown). It also connects via the MMU 11 and a standard 32-bit VME bus 20 to various peripheral devices, including an SMD disk controller 22 controlling one or two disk drives 24, a SCSI host adaptor 26 connected to a SCSI bus 28, a tape controller 30 connected to a quarter-inch tape drive 32, and possibly a network #2 controller 34 connected to a second Ethernet 36. The SMD disk controller 22 can communicate with memory array 16 by direct memory access via bus 20 and MMU 11, with either the disk controller or the MMU acting as a bus master. This configuration is illustrative; many variations are available.

The system communicates over the Ethernets using industry standard TCP/IP and NFS protocol stacks. A description of protocol stacks in general can be found in Tanenbaum, "Computer Networks" (Second Edition, Prentice Hall: 1988). File server protocol stacks are described at pages 535-546. The Tanenbaum reference is incorporated herein by reference.

Basically, the following protocol layers are implemented in the apparatus of FIG. 1:

Network Layer. The network layer converts data packets between a format specific to Ethernets and a format which is independent of the particular type of network used. The Ethernet-specific format which is used in the apparatus of FIG. 1 is described in Hornig, "A Standard For The Transmission of IP Datagrams Over Ethernet Networks," RFC 894 (April 1984), which is incorporated herein by reference.

The Internet Protocol (IP) Layer. This layer provides the functions necessary to deliver a package of bits (an internet datagram) from a source to a destination over an interconnected system of networks. For messages to be sent from the file server to a client, a higher level in the server calls the IP module, providing the internet address of the destination client and the message to transmit. The IP module performs any required fragmentation of the message to accommodate packet size limitations of any intervening gateway, adds internet headers to each fragment, and calls on the network layer to transmit the resulting internet datagrams. The internet header includes a local network destination address (translated from the internet address) as well as other parameters.

For messages received by the IP layer from the network layer, the IP module determines from the internet address whether the datagram is to be forwarded to another host on another network, for example on a second Ethernet such as 36 in FIG. 1, or whether it is intended for the server itself. If it is intended for another host on the second network, the IP module determines a local net address for the destination and calls on the local network layer for that network to send the datagram. If the datagram is intended for an application program within the server, the IP layer strips off the header and passes the remaining portion of the message to the appropriate next higher layer. The internet protocol standard used in the illustrative apparatus of FIG. 1 is specified in Information Sciences Institute, "Internet Protocol, DARPA Internet Program Protocol Specification," RFC 791 (September 1981), which is incorporated herein by reference.

TCP/UDP Layer. This layer is a datagram service with more elaborate packaging and addressing options than the IP layer. For example, whereas an IP datagram can hold about 1,500 bytes and be addressed to hosts, UDP datagrams can hold about 64 KB and be addressed to a particular port within a host. TCP and UDP are alternative protocols at this layer; applications requiring ordered reliable delivery of streams of data may use TCP, whereas applications (such as NFS) which do not require ordered and reliable delivery may use UDP.

The prior art file server of FIG. 1 uses both TCP and UDP. It uses UDP for file server-related services, and uses TCP for certain other services which the server provides to network clients. The UDP is specified in Postel, "User Datagram Protocol," RFC 768 (August 28, 1980), which is incorporated herein by reference. TCP is specified in Postel, "Transmission Control Protocol," RFC 761 (January 1980) and RFC 793 (September 1981), which is also incorporated herein by reference.

XDR/RPC Layer. This layer provides functions callable from higher level programs to run a designated procedure on a remote machine. It also provides the decoding necessary to permit a client machine to execute a procedure on the server. For example, a caller process in a client node may send a call message to the server of FIG. 1. The call message includes a specification of the desired procedure, and its parameters. The message is passed up the stack to the RPC layer, which calls the appropriate procedure within the server. When the procedure is complete, a reply message is generated and RPC passes it back down the stack and over the network to the caller client. RPC is described in Sun Microsystems, Inc., "RPC: Remote Procedure Call Protocol Specification, Version 2," RFC 1057 (June 1988), which is incorporated herein by reference.

RPC uses the XDR external data representation standard to represent information passed to and from the underlying UDP layer. XDR is merely a data encoding standard, useful for transferring data between different computer architectures. Thus, on the network side of the XDR/RPC layer, information is machine-independent; on the host application side, it may not be. XDR is described in Sun Microsystems, Inc., "XDR: External Data Representation Standard," RFC 1014 (June 1987), which is incorporated herein by reference.

NFS Layer. The NFS ("network file system") layer is one of the programs available on the server which an RPC request can call. The combination of host address, program number, and procedure number in an RPC request can specify- one remote NFS procedure to be called.

Remote procedure calls to NFS on the file server of FIG. 1 provide transparent, stateless, remote access to shared files on the disks 24. NFS assumes a file system that is hierarchical, with directories as all but the bottom level of files. Client hosts can call any of about 20 NFS procedures including such procedures as reading a specified number of bytes from a specified file; writing a specified number of bytes to a specified file; creating, renaming and removing specified files; parsing directory trees; creating and removing directories; and reading and setting file attributes. The location on disk to which and from which data is stored and retrieved is always specified in logical terms, such as by a file handle or Inode designation and a byte offset. The details of the actual data storage are hidden from the client. The NFS procedures, together with possible higher level modules such as Unix VFS and UFS, perform all conversion of logical data addresses to physical data addresses such as drive, head, track and sector identification. NFS is specified in Sun Microsystems, Inc., "NFS: Network File System Protocol Specification," RFC 1094 (March 1989), incorporated herein by reference.

With the possible exception of the network layer, all the protocol processing described above is done in software, by a single processor in the host CPU card 10. That is, when an Ethernet packet arrives on Ethernet 12, the host CPU 10 performs all the protocol processing in the NFS stack, as well as the protocol processing for any other application which may be running on the host 10. NFS procedures are run on the host CPU 10, with access to memory 16 for both data and program code being provided via MMU 11. Logically specified data addresses are converted to a much more physically specified form and communicated to the SMD disk controller 22 or the SCSI bus 28, via the VME bus 20, and all disk caching is done by the host CPU 10 through the memory 16. The host CPU card 10 also runs procedures for performing various other functions of the file server, communicating with tape controller 30 via the VME bus 20. Among these are client-defined remote procedures requested by client workstations.

If the server serves a second Ethernet 36, packets from that Ethernet are transmitted to the host CPU 10 over the same VME bus 20 in the form of IP datagrams. Again, all protocol processing except for the network layer is performed by software processes running on the host CPU 10. In addition, the protocol processing for any message that is to be sent from the server out on either of the Ethernets 12 or 36 is also done by processes running on the host CPU 10.

It can be seen that the host CPU 10 performs an enormous amount of processing of data, especially if 5-10 clients on each of the two Ethernets are making file server requests and need to be sent responses on a frequent basis. The host CPU 10 runs a multitasking Unix operating system, so each incoming request need not wait for the previous request to be completely processed and returned before being processed. Multiple processes are activated on the host CPU 10 for performing different stages of the processing of different requests, so many requests may be in process at the same time. But there is only one CPU on the card 10, so the processing of these requests is not accomplished in a truly parallel manner. The processes are instead merely time sliced. The CPU 10 therefore represents a major bottleneck in the processing of file server requests.

Another bottleneck occurs in MMU 11, which must transmit both instructions and data between the CPU card 10 and the memory 16. All data flowing between the disk drives and the network passes through this interface at least twice.

Yet another bottleneck can occur on the VME bus 20, which must transmit data among the SMD disk controller 22, the SCSI host adaptor 26, the host CPU card 10, and possibly the network #2 controller 24.

PREFERRED EMBODIMENT-OVERALL HARDWARE ARCHITECTURE

Figure 2:
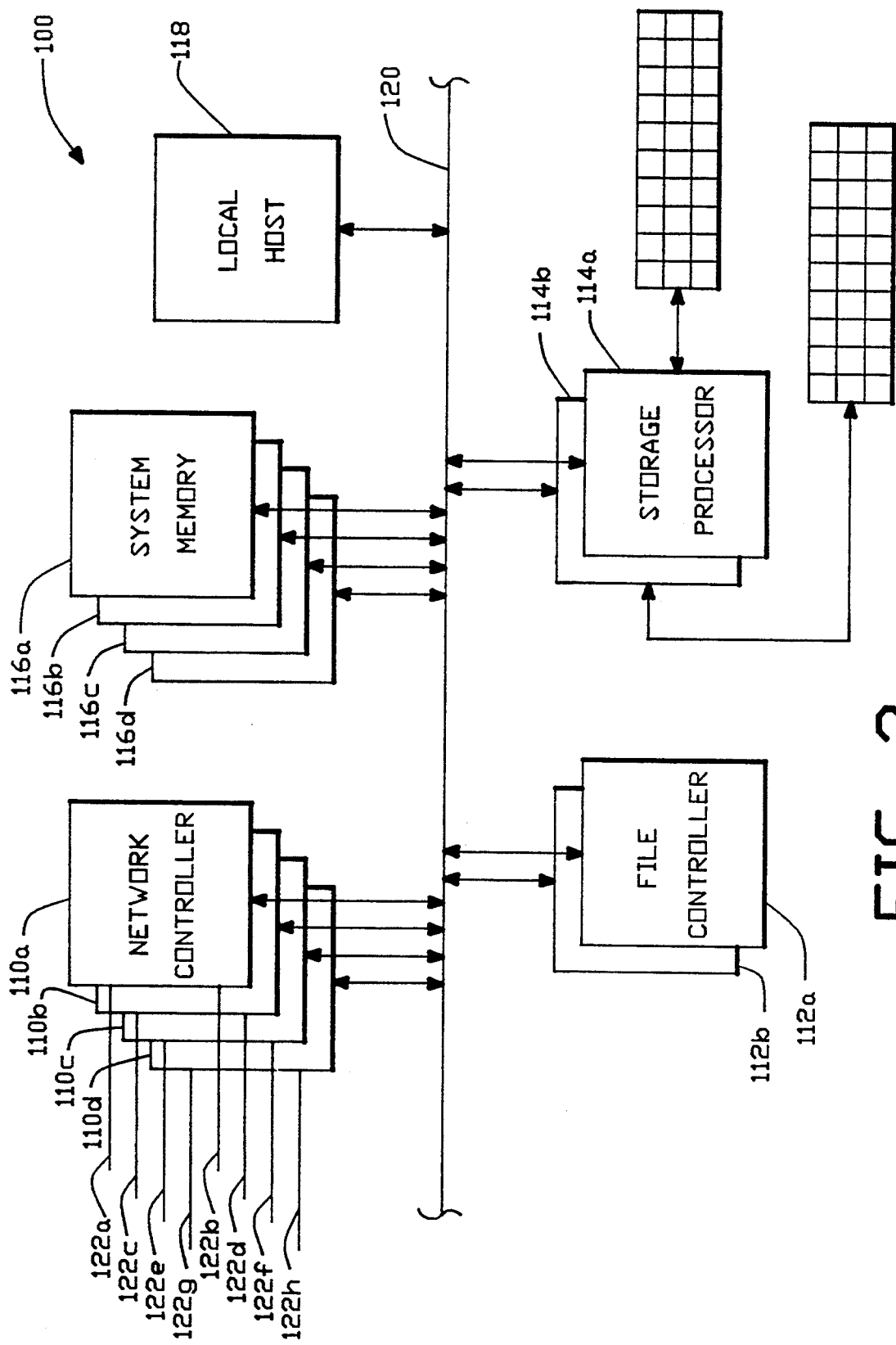
FIG. 2 is a block diagram of a file server architecture according to the invention.

In FIG. 2 there is shown a block diagram of a network file server 100 according to the invention. It can include multiple network controller (NC) boards, one or more file controller (FC) boards, one or more storage processor (SP) boards, multiple system memory boards, and one or more host processors. The particular embodiment shown in FIG. 2 includes four network controller boards 110a-110d, two file controller boards 112a-112b, two storage processors 114a-114b, four system memory cards 116a-116d for a total of 192 MB of memory, and one local host processor 118. The boards 110, 112, 114, 116 and 118 are connected together over a VME bus 120 on which an enhanced block transfer mode as described in the ENHANCED VMEBUS PROTOCOL application identified above may be used. Each of the four network controllers 110 shown in FIG. 2 can be connected to up to two Ethernets 122, for a total capacity of 8 Ethernets 122a-122h. Each of the storage processors 114 operates ten parallel SCSI busses, nine of which can each support up to three SCSI disk drives each. The tenth SCSI channel on each of the storage processors 114 is used for tape drives and other SCSI peripherals.

The host 118 is essentially a standard SunOs Unix processor, providing all the standard Sun Open Network Computing (ONC) services except NFS and IP routing. Importantly, all network requests to run a user-defined procedure are passed to the host for execution. Each of the NC boards 110, the FC boards 112 and the SP boards 114 includes its own independent 32-bit microprocessor. These boards essentially off-load from the host processor 118 virtually all of the NFS and disk processing. Since the vast majority of messages to and from clients over the Ethernets 122 involve NFS requests and responses, the processing of these requests in parallel by the NC, FC and SP processors, with minimal involvement by the local host 118, vastly improves file server performance. Unix is explicitly eliminated from virtually all network, file, and storage processing.

OVERALL SOFTWARE ORGANIZATION AND DATA FLOW

Prior to a detailed discussion of the hardware subsystems shown in FIG. 2, an overview of the software structure will now be undertaken. The software organization is described in more detail in the above-identified application entitled MULTIPLE FACILITY OPERATING SYSTEM ARCHITECTURE.

Most of the elements of the software are well known in the field and are found in most networked Unix systems, but there are two components which are not: Local NFS ("LNFS") and the messaging kernel ("MK") operating system kernel. These two components will be explained first.

The Messaging Kernel. The various processors in file server 100 communicate with each other through the use of a messaging kernel running on each of the processors 110, 112, 114 and 118. These processors do not share any instruction memory, so task-level communication cannot occur via straightforward procedure calls as it does in conventional Unix. Instead, the messaging kernel passes messages over VME bus 120 to accomplish all necessary inter-processor communication. Message passing is preferred over remote procedure calls for reasons of simplicity and speed.

Messages passed by the messaging kernel have a fixed 128-byte length. Within a single processor, messages are sent by reference; between processors, they are copied by the messaging kernel and then delivered to the destination process by reference. The processors of FIG. 2 have special hardware, discussed below, that can expediently exchange and buffer interprocessor messaging kernel messages.

The LNFS Local NFS interface. The 22-function NFS standard was specifically designed for stateless operation using unreliable communication. This means that neither clients nor server can be sure if they hear each other when they talk (unreliability). In practice, an in an Ethernet environment, this works well.

Within the server 100, however, NFS level datagrams are also used for communication between processors, in particular between the network controllers 110 and the file controller 112, and between the host processor 118 and the file controller 112. For this internal communication to be both efficient and convenient, it is undesirable and impractical to have complete statelessness or unreliable communications. Consequently, a modified form of NFS, namely LNFS, is used for internal communication of NFS requests and responses. LNFS is used only within the file server 100; the external network protocol supported by the server is precisely standard, licensed NFS. LNFS is described in more detail below.

The Network Controllers 110 each run an NFS server which, after all protocol processing is done up to the NFS layer, converts between external NFS requests and responses and internal LNFS requests and responses. For example, NFS requests arrive as RPC requests with XDR and enclosed in a UDP datagram. After protocol processing, the NFS server translates the NFS request into LNFS form and uses the messaging kernel to send the request to the file controller 112.

The file controller runs an LNFS server which handles LNFS requests both from network controllers and from the host 118. The LNFS server translates LNFS requests to a form appropriate for a file system server, also running on the file controller, which manages the system memory file data cache through a block I/O layer.

An overview of the software in each of the processors will now be set forth.

Network Controller 110

The optimized dataflow of the server 100 begins with the intelligent network controller 110. This processor receives Ethernet packets from client workstations. It quickly identifies NFS-destined packets and then performs full protocol processing on them to the NFS level, passing the resulting LNFS requests directly to the file controller 112. This protocol processing includes IP routing and reassembly, UDP demultiplexing, XDR decoding, and NFS request dispatching. The reverse steps are used to send an NFS reply back to a client. Importantly, these time-consuming activities are performed directly in the Network Controller 110, not in the host 118.

The server 100 uses conventional NFS ported from Sun Microsystems, Inc., Mountain View, Calif., and is NFS protocol compatible.

Non-NFS network traffic is passed directly to its destination host processor 118.

The NCs 110 also perform their own IP routing. Each network controller 110 supports two fully parallel Ethernets. There are four network controllers in the embodiment of the server 100 shown in FIG. 2, so that server can support up to eight Ethernets. For the two Ethernets on the same network controller 110, IP routing occurs completely within the network controller and generates no backplane traffic. Thus attaching two mutually active-Ethernets to the same controller not only minimizes their inter-net transit time, but also significantly reduces backplane contention on the VME bus 120. Routing table updates are distributed to the network controllers from the host processor 118, which runs either the gated or routed Unix demon.

While the network controller described here is designed for Ethernet LANs, it will be understood that the invention can be used just as readily with other network types, including FDDI.

File Controller 112

In addition to dedicating a separate processor for NFS protocol processing and IP routing, the server 100 also dedicates a separate processor, the intelligent file controller 112, to be responsible for all file system processing. It uses conventional Berkeley Unix 4.3 file system code and uses a binary-compatible data representation on disk. These two choices allow all standard file system utilities (particularly block-level tools) to run unchanged.

The file controller 112 runs the shared file system used by all NCs 110 and the host processor 118. Both the NCs and the host processor communicate with the file controller 112 using the LNFS interface. The NCs 110 use LNFS as described above, while the host processor 118 uses LNFS as a plug-in module to SunOs's standard Virtual File System ("VFS") interface.

When an NC receives an NFS read request from a client workstation, the resulting LNFS request passes to the FC 112. The FC 112 first searches the system memory 116 buffer cache for the requested data. If found, a reference to the buffer is returned to the NC 110. If not found, the LRU (least recently used) cache buffer in system memory 116 is freed and reassigned for the requested block. The FC then directs the SP 114 to read the block into the cache buffer from a disk drive array. When complete, the SP so notifies the FC, which in turn notifies the NC 100. The NC 110 then sends an NFS reply, with the data from the buffer, back to the NFS client workstation out on the network. Note that the SP 114 transfers the data into system memory 116, if necessary, and the NC 110 transferred the data from system memory 116 to the networks. The process takes place without any involvement of the host 118.

Storage Processor

The intelligent storage processor 114 manages all disk and tape storage operations. While autonomous, storage processors are primarily directed by the file controller 112 to move file data between system memory 116 and the disk subsystem. The exclusion of both the host 118 and the FC 112 from the actual data path helps to supply the performance needed to service many remote clients.

Additionally, coordinated by a Server Manager in the host 118, storage processor 114 can execute server backup by moving data between the disk subsystem and tape or other archival peripherals on the SCSI channels. Further, if directly accessed by host processor 118, SP 114 can provide a much higher performance conventional disk interface for Unix, virtual memory, and databases. In Unix nomenclature, the host processor 118 can mount boot, storage swap, and raw partitions via the storage processors 114.

Each storage processor 114 operates ten parallel, fully synchronous SCSI channels (busses) simultaneously. Nine of these channels support three arrays of nine SCSI disk drives each, each drive in an array being assigned to a different SCSI channel. The tenth SCSI channel hosts up to seven tape and other SCSI peripherals. In addition to performing reads and writes, SP 114 performs device-level optimizations such as disk seek queue sorting, directs device error recovery, and controls DMA transfers between the devices and system memory 116.

Host Processor 118

The local host 118 has three main purposes: to run Unix, to provide standard ONC network services for clients, and to run a Server Manager. Since Unix and ONC are ported from the standard SunOs Release 4 and ONC Services Release 2, the server 100 can provide identically compatible high-level ONC services such as the Yellow Pages, Lock Manager, DES Key Authenticator, Auto Mounter, and Port Mapper. Sun/2 Network disk booting and more general IP internet services such as Telnet, FTP, SMTP, SNMP, and reverse ARP are also supported. Finally, print spoolers and similar Unix demons operate transparently.

The host processor 118 runs the following software modules:

TCP and socket layers. The Transport Control Protocol ("TCP"), which is used for certain server functions other than NFS, provides reliable bytestream communication between two processors. Socket are used to establish TCP connections.

VFS interface. The Virtual File System ("VFS") interface is a standard SunOs file system interface. It paints a uniform file-system picture for both users and the non-file parts of the Unix operating system, hiding the details of the specific file system. Thus standard NFS, LNFS, and any local Unix file system can coexist harmoniously.

UFS interface. The Unix File System ("UFS") interface is the traditional and well-known Unix interface for communication with local-to-the-processor disk drives. In the server 100, it is used to occasionally mount storage processor volumes directly, without going through the file controller 112. Normally, the host 118 uses LNFS and goes through the file controller.

Device layer. The device layer is a standard software interface between the Unix device model and different physical device implementations. In the server 100, disk devices are not attached to host processors directly, so the disk driver in the host's device layer uses the messaging kernel to communicate with the storage processor 114.

Route and Port Mapper Demons. The Route and Port Mapper demons are Unix user-level background processes that maintain the Route and Port databases for packet routing. They are mostly inactive and not in any performance path.

Yellow Pages and Authentication Demon. The Yellow Pages and Authentication services are Sun-ONC standard network services. Yellow Pages is a widely used multipurpose name-to-name directory lookup service. The Authentication service uses cryptographic keys to authenticate, or validate, requests to insure that requestors have the proper privileges for any actions or data they desire.

Server Manager. The Server Manager is an administrative application suite that controls configuration, logs error and performance reports, and provides a monitoring and tuning interface for the system administrator. These functions can be exercised from either system console connected to the host 118, or from a system administrator's workstation.

The host processor 118 is a conventional OEM Sun central processor card, Model 3E/120. It incorporates a Motorola 68020 microprocessor and 4 MB of on-board memory. Other processors, such as a SPARC-based processor, are also possible.

The structure and operation of each of the hardware components of server 100 will now be described in detail.

NETWORK CONTROLLER HARDWARE ARCHITECTURE

Figure 3:
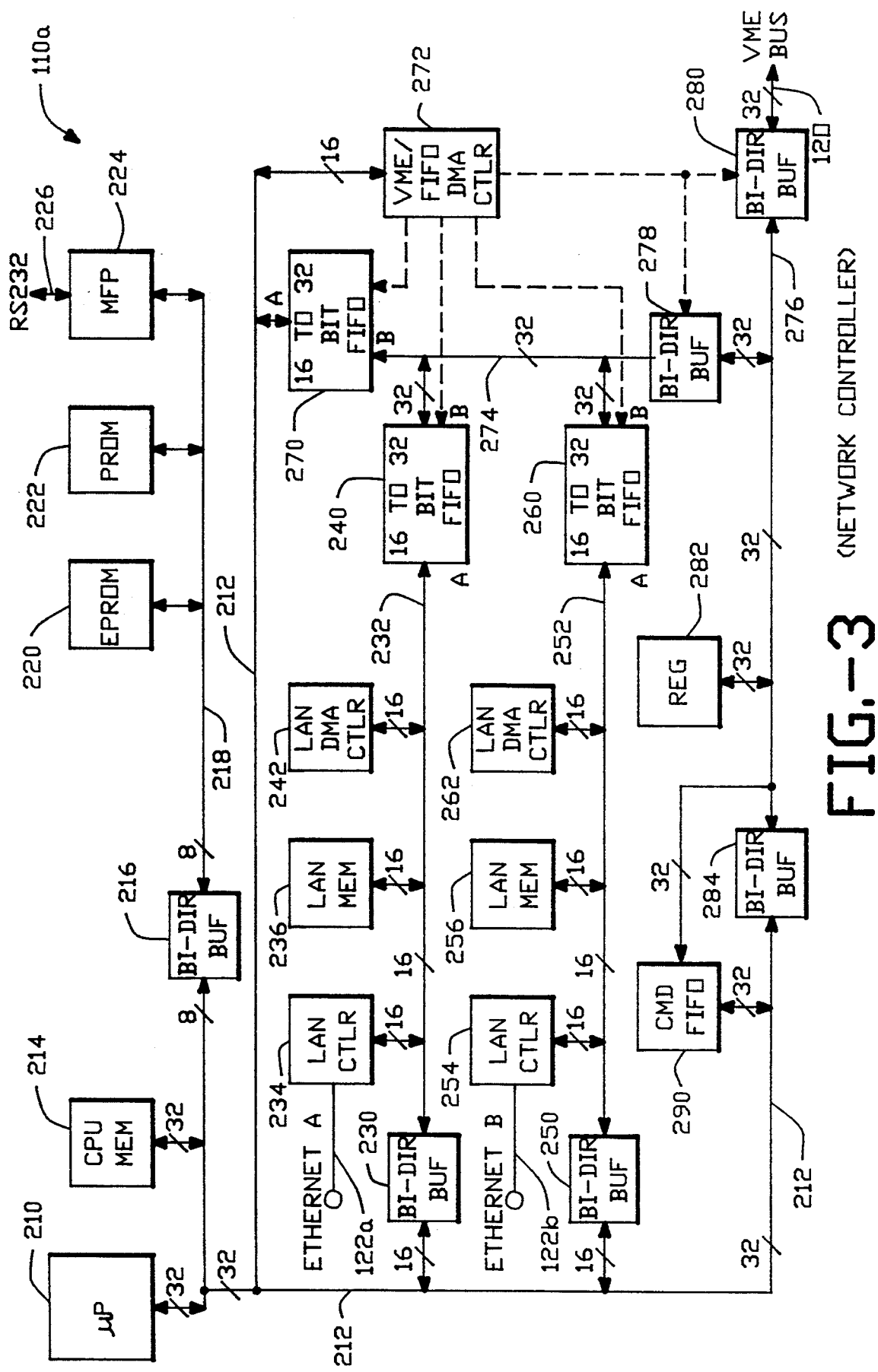
FIG. 3 is a block diagram of one of the network controllers shown in FIG. 2.

FIG. 3 is a block diagram showing the data path and some control paths for an illustrative one of the network controllers 110a. It comprises a 20 MHz 68020 microprocessor 210 connected to a 32-bit microprocessor data bus 212. Also connected to the microprocessor data bus 212 is a 256K byte CPU memory 214. The low order 8 bits of the microprocessor data bus 212 are connected through a bidirectional buffer 216 to an 8-bit slow-speed data bus 218. On the slow-speed data bus 218 is a 128K byte EPROM 220, a 32 byte PROM 222, and a multi-function peripheral (MFP) 224. The EPROM 220 contains boot code for the network controller 110a, while the PROM 222 stores various operating parameters such as the Ethernet addresses assigned to each of the two Ethernet-interfaces on the board. Ethernet address information is read into the corresponding interface control block in the CPU memory 214 during initialization. The MFP 224 is a Motorola 68901, and performs various local functions such as timing, interrupts, and general purpose I/O. The MFP 224 also includes a UART for interfacing to an RS232 port 226. These functions are not critical to the invention and will not be further described herein.

The low order 16 bits of the microprocessor data bus 212 are also coupled through a bidirectional buffer 230 to a 16-bit LAN data bus 232. A LAN controller chip 234, such as the Am7990 LANCE Ethernet controller manufactured by Advanced Micro Devices, Inc. Sunnyvale, Calif., interfaces the LAN data bus 232 with the first Ethernet 122a shown in FIG. 2. Control and data for the LAN controller 234 are stored in a 512K byte LAN memory 236, which is also connected to the LAN data bus 232. A specialized 16 to 32 bit FIFO chip 240, referred to herein as a parity FIFO chip and described below, is also connected to the LAN data bus 232. Also connected to the LAN data bus 232 is a LAN DMA controller 242, which controls movements of packets of data between the LAN memory 236 and the FIFO chip 240. The LAN DMA controller 242 may be a Motorola M68440 DMA controller using channel zero only.

The second Ethernet 122b shown in FIG. 2 connects to a second LAN data bus 252 on the network controller card 110a shown in FIG. 3. The LAN data bus 252 connects to the low order 16 bits of the microprocessor data bus 212 via a bidirectional buffer 250, and has similar components to those appearing on the LAN data bus 232. In particular, a LAN controller 254 interfaces the LAN data bus 252 with the Ethernet 122b, using LAN memory 256 for data and control, and a LAN DMA controller 262 controls DMA transfer of data between the LAN memory 256 and the 16-bit wide data port A of the parity FIFO 260.

The low order 16 bits of microprocessor data bus 212 are also connected directly to another parity FIFO 270, and also to a control port of a VME/FIFO DMA controller 272. The FIFO 270 is used for passing messages between the CPU memory 214 and one of the remote boards 110, 112, 114, 116 or 118 (FIG. 2) in a manner described below. The VME/FIFO DMA controller 272, which supports three round-robin non-prioritized channels for copying data, controls all data transfers between one of the remote boards and any of the FIFOs 240, 260 or 270, as well as between the FIFOs 240 and 260.

32-bit data bus 274, which is connected to the 32-bit port B of each of the FIFOs 240, 260 and 270, is the data bus over which these transfers take place. Data bus 274 communicates with a local 32-bit bus 276 via a bidirectional pipelining latch 278, which is also controlled by VME/FIFO DMA controller 727, which in turn communicates with the VME bus 120 via a bidirectional buffer 280.

The local data bus 276 is also connected to a set of control registers 282, which are directly addressable across the VME bus 120. The registers 282 are used mostly for system initialization and diagnostics.

The local data bus 276 is also coupled to the microprocessor data bus 212 via a bidirectional buffer 284. When the NC 110a operates in slave mode, the CPU memory 214 is directly addressable from VME bus 120. One of the remote boards can copy data directly from the CPU memory 214 via the bidirectional buffer 284. LAN memories 236 and 256 are not directly addressed over VME bus 120.

The parity FIFOs 240, 260 and 270 each consist of an ASIC, the functions and operation of which are described in the Appendix. The FIFOs 240 and 260 are configured for packet data transfer and the FIFO 270 is configured for massage passing. Referring to the Appendix, the FIFOs 240 and 260 are programmed with the following bit settings in the Data Transfer Configuration Register:

| Bit | Definition | Setting |
| --- | --- | --- |
| 0 | WD Mode | N/A |
| 1 | Parity Chip | N/A |
| 2 | Parity Correct Mode | N/A |
| 3 | 8/16 bits CPU & PortA interface | 16 bits (1) |
| 4 | Invert Port A address 0 | no (0) |
| 5 | Invert Port A address 1 | yes (1) |
| 6 | Checksum Carry Wrap | yes (1) |
| 7 | Reset | no (0) |

The Data Transfer Control Register is programmed as follows:

| Bit | Definition | Setting |
| --- | --- | --- |
| 0 | Enable PortA Req/Ack | yes (1) |
| 1 | Enable PortB Req/Ack | yes (1) |
| 2 | Data Transfer Direction | (as desired) |
| 3 | CPU parity enable | no (0) |
| 4 | PortA parity enable | no (0) |
| 5 | PortB parity enable | no (0) |
| 6 | Checksum Enable | yes (1) |
| 7 | PortA Master | yes (1) |

Unlike the configuration used on FIFOs 240 and 260, the microprocessor 210 is responsible for loading and unloading Port A directly. The microprocessor 210 reads an entire 32-bit word from port A with a single instruction using two port A access cycles. Port A data transfer is disabled by unsetting bits 0 (Enable PortA Req/Ack) and 7 (PortA Master) of the Data Transfer Control Register.

The remainder of the control settings in FIFO 270 are the same as those in FIFOs 240 and 260 described above.

The NC 110a also includes a command FIFO 290. The command FIFO 290 includes an input port coupled to the local data bus 276, and which is directly addressable across the VME bus 120, and includes an output port connected to the microprocessor data bus 212. As explained in more detail below, when one of the remote boards issues a command or response to the NC 110a, it does so by directly writing a 1-word (32-bit) message descriptor into NC 110a's command FIFO 290. Command FIFO 290 generates a "FIFO not empty" status to the microprocessor 210, which then reads the message descriptor off the top of FIFO 290 and processes it. If the message is a command, then it includes a VME address at which the message is located (presumably an address in a shared memory similar to 214 on one of the remote boards). The microprocessor 210 then programs the FIFO 270 and the VME/FIFO DMA controller 272 to copy the message from the remote location into the CPU memory 214.

Command FIFO 290 is a conventional two-port FIFO, except that additional circuitry is included for generating a Bus Error signal on VME bus 120 if an attempt is made to write to the data input port while the FIFO is full. Command FIFO 290 has space for 256 entries.

A noteworthy feature of the architecture of NC 110a is that the LAN buses 232 and 252 are independent of the mioroprocessor data bus 212. Data packets being routed to or from an Ethernet are stored in LAN memory 236 on the LAN data bus 232 (or 256 on the LAN data bus 252), and not in the CPU memory 214. Data transfer between the LAN memories 236 and 256 and the Ethernets 1228 and 122b, are controlled by LAN controllers 234 and 254, respectively, while most data transfer between LAN memory 236 or 256 and a remote port on the VME bus 120 are controlled by LAN DMA Controllers 242 and 262, FIFOs 240 and 260, and VME/FIFO DMA controller 272. An exception to this rule occurs when the size of the data transfer is small, e.g., less than 64 bytes, in which case microprocessor 210 copies it directly without using DMA. The microprocessor 210 is not involved in larger transfers except in initiating them and in receiving notification when they are complete.

The CPU memory 214 contains mostly instructions for microprocessor 210, messages being transmitted to or from a remote board via FIFO 270, and various data blocks for controlling the FIFOs, the DMA controllers and the LAN controllers. The microprocessor 210 accesses the data packets in the LAN memories 236 and 256 by directly addressing them through the bidirectional buffers 230 and 250, respectively, for protocol processing. The local high-speed static RAM in CPU memory 214 can therefore provide zero wait state memory access for microprocessor 210 independent of network traffic. This is in sharp contrast to the prior art architecture shown in FIG. 1, in which all data and data packets, as well as microprocessor instructions for host CPU card 10, reside in the memory 16 and must communicate with the host CPU card 10 via the MMU 11.

While the LAN data buses 232 and 252 are shown as separate buses in FIG. 3, it will be understood that they may instead be implemented as a single combined bus.

NETWORK CONTROLLER OPERATION

In operation, when one of the LAN controllers (such as 234) receives a packet of information over its Ethernet 122a, it reads in the entire packet and stores it in corresponding LAN memory 236. The LAN controller 234 then issues an interrupt to microprocessor 210 via MFP 224, and the microprocessor 210 examines the status register on LAN controller 234 (via bidirectional buffer 230) to determine that the event causing the interrupt was a "receive packet completed." In order to avoid a potential lockout of the second Ethernet 122b caused by the prioritized interrupt handling characteristic of MFP 224, the microprocessor 210 does not at this time immediately process the received packet; instead, such processing is scheduled for a polling function.

When the polling function reaches the processing of the received packet, control over the packet is passed to a software link level receive module. The link level receive module then decodes the packet according to either of two different frame formats: standard Ethernet format or SNAP (IEEE 802 LCC) format. An entry in the header in the packet specifies which frame format was used. The link level driver then determines which of three types of messages is contained in the received packet: (1) IP, (2) ARP packets which can be handled by a local ARP module, or (3) ARP packets and other packet types which must be forwarded to the local host 118 (FIG. 2) for processing. If the packet is an ARP packet which can be handled by the NC 110a, such as a request for the address of server 100, then the microprocessor 210 assembles a response packet in LAN memory 236 and, in a conventional manner, causes LAN controller 234 to transmit that packet back over Ethernet 122a. It is noteworthy that the data manipulation for accomplishing this task is performed almost completely in LAN memory 236, directly addressed by microprocessor 210 as controlled by instructions in CPU memory 214. The function is accomplished also without generating any traffic on the VME backplane 120 at all, and without disturbing the local host 118.

If the received packet is either an ARP packet which cannot be processed completely in the NC 110a, or is another type of packet which requires delivery to the local host 118 (such as a client request for the server 100 to execute a client-defined procedure), then the microprocessor 210 programs LAN DMA controller 242 to load the packet from LAN memory 236 into FIFO 240, programs FIFO 240 with the direction of data transfer, and programs DMA controller 272 to read the packet out of FIFO 240 and across the VME bus 120 into system memory 116. In particular, the microprocessor 210 first programs the LAN DMA controller 242 with the starting address and length of the packet in LAN memory 236, and programs the controller to begin transferring data from the LAN memory 236 to port A of parity FIFO 240 as soon as the FIFO is ready to receive data. Second, microprocessor 210 programs the VME/FIFO DMA controller 272 with the destination address in system memory 116 and the length of the data packet, and instructs the controller to begin transferring data from port B of the FIFO 260 onto VME bus 120. Finally, the microprocessor 210 programs FIFO 240 with the direction of the transfer to take place. The transfer then proceeds entirely under the control of DMA controllers 242 and 272, without any further involvement by microprocessor 210.

The microprocessor 210 then sends a message to host 118 that a packet is available at a specified system memory address. The microprocessor 210 sends such a message by writing a message descriptor to a software-emulated command FIFO on the host, which copies the message from CPU memory 214 on the NC via buffer 284 and into the host's local memory, in ordinary VME block transfer mode. The host then copies the packet from system memory 116 into the host's own local memory using ordinary VME transfers.

If the packet received by NC 110a from the network is an IP packet, then the microprocessor 210 determines whether it is (1) an IP packet for the server 100 which is not an NFS packet; (2) an IP packet to be routed to a different network; or (3) an NFS packet. If it is an IP packet for the server 100, but not an NFS packet, then the microprocessor 210 causes the packet to be transmitted from the LAN memory 236 to the host 118 in the same manner described above with respect to certain ARP packets.

If the IP packet is not intended for the server 100, but rather is to be routed to a client on a different network, then the packet is copied into the LAN memory associated with the Ethernet to which the destination client is connected. If the destination client is on the Ethernet 122b, which is on the same NC board as the source Ethernet 122a, then the microprocessor 210 causes the packet to be copied from LAN memory 236 into LAN 256 and then causes LAN controller 254 to transmit it over Ethernet 122b. (Of course, if the two LAN data buses 232 and 252 are combined, then copying would be unnecessary; the microprocessor 210 would simply cause the LAN controller 254 to read the packet out of the same locations in LAN memory to which the packet was written by LAN controller 234.)

The copying of a packet from LAN memory 236 to LAN memory 256 takes place similarly to the copying described above from LAN memory to system memory. For transfer sizes of 64 bytes or more, the microprocessor 210 first programs the LAN DMA controller 242 with the starting address and length of the packet in LAN memory 236, and programs the controller to begin transferring data from the LAN memory 236 into port A of parity FIFO 240 as soon as the FIFO is ready to receive data. Second, microprocessor 210 programs the LAN DMA controller 262 with a destination address in LAN memory 256 and the length of the data packet, and instructs that controller to transfer data from parity FIFO 260 into the LAN memory 256. Third, microprocessor 210 programs the VME/FIFO DMA controller 272 to clock words of data out of port B of the FIFO 240, over the data bus 274, and into port B of FIFO 260. Finally, the microprocessor 210 programs the two FIFOs 240 and 260 with the direction of the transfer to take place. The transfer then proceeds entirely under the control of DMA controllers 242, 262 and 272, without any further involvement by the microprocessor 210. Like the copying from LAN memory to system memory, if the transfer size is smaller than 64 bytes, the microprocessor 210 performs the transfer directly, without DMA.

When each of the LAN DMA controllers 242 and 262 complete their work, they so notify microprocessor 210 by a respective interrupt provided through MFP 224. When the microprocessor 210 has received both interrupts, it programs LAN controller 254 to transmit the packet on the Ethernet 122b in a conventional manner.

Thus, IP routing between the two Ethernets in a single network controller 110 takes place over data bus 274, generating no traffic over VME bus 120. Nor is the host processor 118 disturbed for such routing, in contrast to the prior art architecture of FIG. 1. Moreover, all but the shortest copying work is performed by controllers outside microprocessor 210, requiring the involvement of the microprocessor 210, and bus traffic on microprocessor data bus 212, only for the supervisory functions of programming the DMA controllers and the parity FIFOs and instructing them to begin. The VME/FIFO DMA controller 272 is programmed by loading control registers via microprocessor data bus 212; the LAN DMA controllers 242 and 262 are programmed by loading control registers on the respective controllers via the microprocessor data bus 212, respective bidirectional buffers 230 and 250, and respective LAN data buses 232 and 252, and the parity FIFOs 240 and 260 are programmed as set forth in the Appendix.

If the destination workstation of the IP packet to be routed is on an Ethernet connected to a different one of the network controllers 110, then the packet is copied into the appropriate LAN memory on the NC 110 to which that Ethernet is connected. Such copying is accomplished by first copying the packet into system memory 116, in the manner described above with respect to certain ARP packets, and then notifying the destination NC that a packet is available. When an NC is so notified, it programs its own parity FIFO and DMA controllers to copy the packet from system memory 116 into the appropriate LAN memory. It is noteworthy that though this type of IP routing does create VME bus traffic, it still does not involve the host CPU 118.

If the IP packet received over the Ethernet 122a and now stored in LAN memory 236 is an NFS packet intended for the server 100, then the microprocessor 210 performs all necessary protocol preprocessing to extract the NFS message and convert it to the local NFS (LNFS) format. This may well involve the logical concatenation of data extracted from a large number of individual IP packets stored in LAN memory 236, resulting in a linked list, in CPU memory 214, pointing to the different blocks of data in LAN memory 236 in the correct sequence.

The exact details of the LNFS format are not important for an understanding of the invention, except to note that it includes commands to maintain a directory of files which are stored on the disks attached to the storage processors 114, commands for reading and writing data to and from a file on the disks, and various configuration management and diagnostics control messages. The directory maintenance commands which are supported by LNFS include the following messages based on conventional NFS: get attributes of a file (GETATTR); set attributes of a file (SETATTR); look up a file (LOOKUP); created a file (CREATE); remove a file (REMOVE); rename a file (RENAME); created a new linked file (LINK); create a symlink (SYMLINK); remove a directory (RMDIR); and return file system statistics (STATFS). The data transfer commands supported by LNFS include read from a file (READ); write to a file (WRITE); read from a directory (READDIR); and read a link (READLINK). LNFS also supports a buffer release command (RELEASE), for notifying the file controller that an NC is finished using a specified buffer in system memory. It also supports a VOP-derived access command, for determining whether a given type access is legal for specified credential on a specified file.

If the LNFS request includes the writing of file data from the LAN memory 236 to disk, the NC 110a first requests a buffer in system memory 116 to be allocated by the appropriate FC 112. When a pointer to the buffer is returned, microprocessor 210 programs LAN DMA controller 242, parity FIFO 240 and VME/FIFO DMA controller 272 to transmit the entire block of file data to system memory 116. The only difference between this transfer and the transfer described above for transmitting IP packets and ARP packets to system memory 116 is that these data blocks will typically have portions scattered throughout LAN memory 236. The microprocessor 210 accommodates that situation by programming LAN DMA controller 242 successively for each portion of the data, in accordance with the linked list, after receiving notification that the previous portion is complete. The microprocessor 210 can program the parity FIFO 240 and the VME/FIFO DMA controller 272 once for the entire message, as long as the entire data block is to be placed contiguously in system memory 116. If it is not, then the microprocessor 210 can program the DMA controller 272 for successive blocks in the same manner LAN DMA controller 242.

If the network controller 110a receives a message from another processor in server 100, usually from file controller 112, that file data is available in system memory 116 for transmission on one of the Ethernets, for example Ethernet 122a, then the network controller 110a copies the file data into LAN memory 236 in a manner similar to the copying of file data in the opposite direction. In particular, the microprocessor 210 first programs VME/FIFO DMA controller 272 with the starting address and length of the data in system memory 116, and programs the controller to begin transferring data over the VME bus 120 into port B of parity FIFO 240 as soon as the FIFO is ready to receive data. The microprocessor 210 then programs the LAN DMA controller 242 with a destination address in LAN memory 236 and then length of the file data, and instructs that controller to transfer data from the parity FIFO 240 into the LAN memory 236. Third, microprocessor 210 programs the parity FIFO 240 with the direction of the transfer to take place. The transfer then proceeds entirely under the control of DMA controllers 242 and 272, without any further involvement by the microprocessor 210. Again, if the file data is scattered in multiple blocks in system memory 116, the microprocessor 210 programs the VME/FIFO DMA controller 272 With a linked list of the blocks to transfer in the proper order.

When each of the DMA controllers 242 and 272 complete their work, they so notify microprocessor 210 through MFP 224. The microprocessor 210 then performs all necessary protocol processing on the LNFS message in LAN memory 236 in order to prepare the message for transmission over the Ethernet 122a in the form of Ethernet IP packets. As set forth above, this protocol processing is performed entirely in network controller 110a, without any involvement of the local host 118.

It should be noted that the parity FIFOs are designed to move multiples of 128-byte blocks most efficiently. The data transfer size through port B is always 32-bits wide, and the VME address corresponding to the 32-bit data must be quad-byte aligned. The data transfer size for port A can be either 8 or 16 bits. For bus utilization reasons, it is set to 16 bits when the corresponding local start address is double-byte aligned, and is set at 8 bits otherwise. The TCP/IP checksum is always computed in the 16 bit mode. Therefore, the checksum word requires byte swapping if the local start address is not double-byte aligned.

Accordingly, for transfer from port B to port A of any of the FIFOs 240, 260 or 270, the microprocessor 210 programs the VME/FIFO DMA controller to pad the transfer count to the next 128-byte boundary. The extra 32-bit word transfers do not involve the VME bus, and only the desired number of 32-bit words will be unloaded from port A.

For transfers from port A to port B of the parity FIFO 270, the microprocessor 210 loads port A word-by-word and forces a FIFO full indication when it is finished. The FIFO full indication enables unloading from port B. The same procedure also takes place for transfers from port A to port B of either of the parity FIFOs 240 or 260, since transfers of fewer than 128 bytes are performed under local microprocessor control rather than under the control of LAN DMA controller 242 or 262. For all of the FIFOs, the VME/FIFO DMA controller is programmed to unload only the desired number of 32-bit words.

FILE CONTROLLER HARDWARE ARCHITECTURE

The file controllers (FC) 112 may each be a standard off-the-shelf microprocessor board, such as one manufactured by Motorola Inc. Preferably, however, a more specialized board is used such as that shown in block diagram form in FIG. 4.

Figure 4:
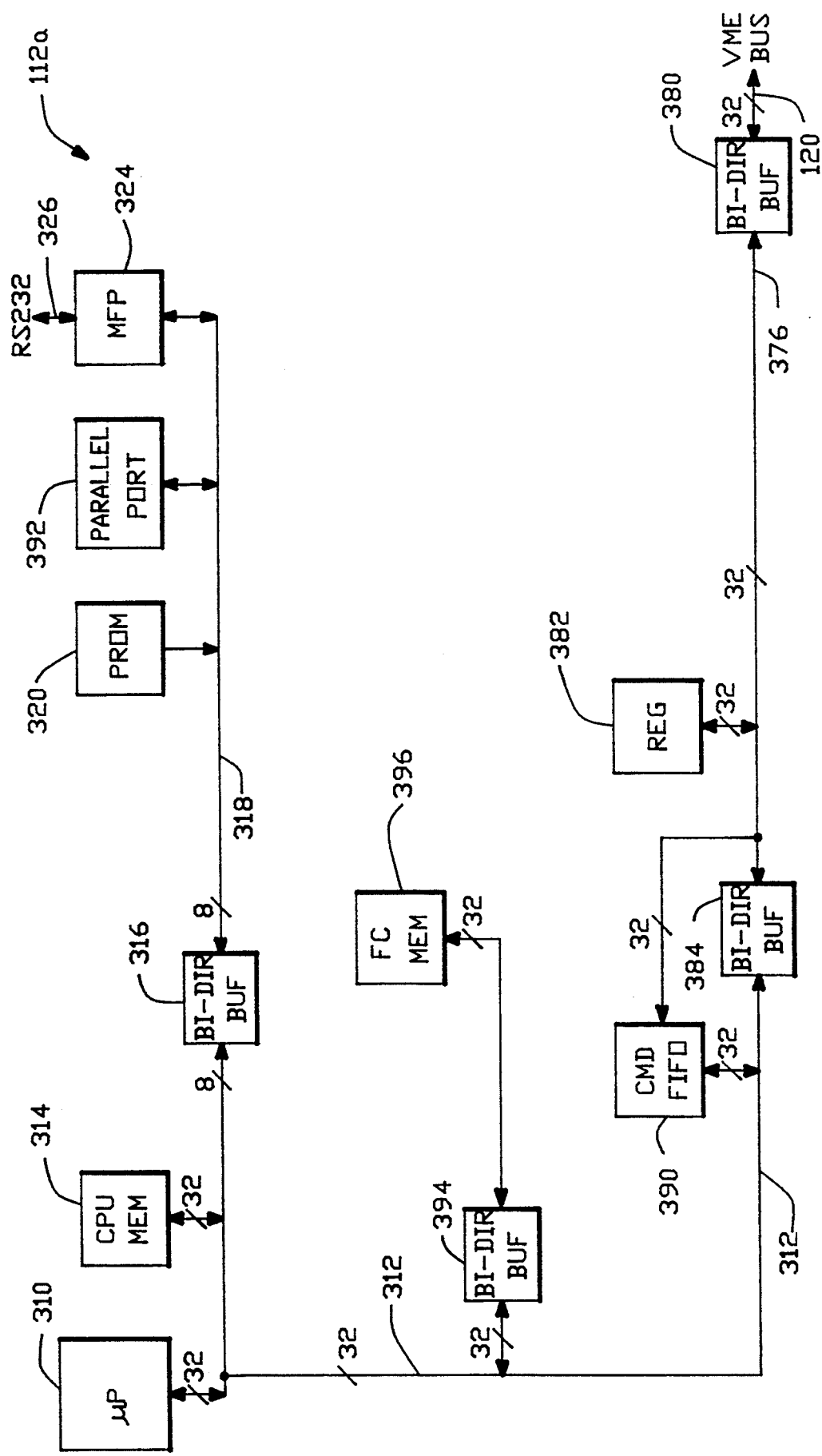
FIG. 4 is a block diagram of one of the file controllers shown in FIG. 2.

FIG. 4 shows one of the FCs 112a, and it will be understood that the other FC can be identical. In many aspects it is simply a scaled-down version of the NC 110a shown in FIG. 3, and in some respects it is scaled up. Like the NC 110a, FC 112a comprises a 20 MHz 68020 microprocessor 310 connected to a 32-bit microprocessor data bus 312. Also connected to the microprocessor data bus 312 is a 256K byte shared CPU memory 314. The low order 8 bits of the microprocessor data bus 312 are connected through a bidirectional buffer 316 to an 8-bit slow-speed data bus 318. On slow-speed data bus 318 are a 128K byte PROM 320, and a multifunction peripheral (MFP) 324. The functions of the PROM 320 and MFP 324 are the same as those described above with respect to EPROM 220 and MFP 224 on NC 110a. FC 112a does not include PROM like the PROM 222 on NC 110a, but does include a parallel port 392. The parallel port 392 is mainly for testing and diagnostics.

Like the NC 110a, the FC 112a is connected to the VME bus 120 via a bidirectional buffer 380 and a 32-bit local data bus 376. A set of control registers 382 are connected to the local data bus 376, and directly addressable across the VME bus 120. The local data bus 376 is also coupled to the microprocessor data bus 312 via a bidirectional buffer 384. This permits the direct addressability of CPU memory 314 from VME bus 120.

FC 112a also includes a command FIFO 390, which includes an input port coupled to the local data bus 376 and which is directly addressable across the VME bus 120. The command FIFO 390 also includes an output port connected to the microprocessor data bus 312. The structure, operation and purpose of command FIFO 390 are the same as those described above with respect to command FIFO 290 on NC 110a.

The FC 112a omits the LAN data buses 323 and 352 which are present in NC 110a, but instead includes a 4 megabyte 32-bit wide FC memory 396 coupled to the microprocessor data bus 312 via a bidirectional buffer 394. As will be seen, FC memory 396 is used as a cache memory for file control information, separate from the file data information cached in system memory 116.

The file controller embodiment shown in FIG. 4 does not include any DMA controllers, and hence cannot act as a master for transmitting or receiving data in any block transfer mode, over the VME bus 120. Block transfers do occur with the CPU memory 314 and the FC memory 396, however, with the FC 112a acting as an VME bus slave. In such transfers, the remote master addresses the CPU memory 314 or the FC memory 396 directly over the VME bus 120 through the bidirectional buffers 384 and, if appropriate, 394.

FILE CONTROLLER OPERATION

The purpose of the FC 112a is basically to provide virtual file system services in response to requests provided in LNFS format by remote processors on the VME bus 120. Most requests will come from a network controller 110, but requests may also come from the local host 118.

The file related commands supported by LNFS are identified above. They are all specified to the FC 112a in terms of logically identified disk data blocks. For example, the LNFS command for reading data from a file includes a specification of the file from which to read (file system ID (FSID) and file ID (inode)), a byte offset, and a count of the number of bytes to read. The FC 112a converts that identification into physical form, namely disk and sector numbers, in order to satisfy the command.

The FC 112a runs a conventional Fast File System (FFS or UFS), which is based on the Berkeley 4.3 VAX release. This code performs the conversion and also performs all disk data caching and control data caching.

However, as previously mentioned, control data caching is performed using the FC memory 396 on FC 112a, whereas disk data caching is performed using the system memory 116 (FIG. 2). Caching this file control information within the FC 112a avoids the VME bus congestion and speed degradation which would result if file control information was cached in system memory 116.

The memory on the FC 112a is directly accessed over the VME bus 120 for three main purposes. First, and by far the most frequent, are accesses to FC memory 396 by an SP 114 to read or write cached file control information. These are accesses requested by FC 112a to write locally modified file control structures through to disk, or to read file control structures from disk. Second, the FC's CPU memory 314 is accessed directly by other processors for message transmissions from the FC 112a to such other processors. For example, if a data block in system memory is to be transferred to an SP 114 for writing to disk, the FC 112a first assembles a message in its local memory 314 requesting such a transfer. The FC 112a then notifies the SP 114, which copies the message directly from the CPU memory 314 and executes the requested transfer.

A third type of direct access to the FC's local memory occurs when an LNFS client reads directory entries. When FC 112a receives an LNFS request to read directory entries, the FC 112a formats the requested directory entries in FC memory 396 and notifies the requestor of their location. The requestor then directly accesses FC memory 396 to read the entries.

The version of the UFS code on FC 112a includes some modifications in order to separate the two caches. In particular, two sets of buffer headers are maintained, one for the FC memory 396 and one for the system memory 116. Additionally, a second set of the system buffer routines (GETBLK(), BRELSE(), BREAD(), BWRITE(), and BREADA()) exist, one for buffer accesses to FC Mem 396 and one for buffer accesses to system memory 116. The UFS-code is further modified to call the appropriate buffer routines for FC memory 396 for accesses to file control information, and to call the appropriate buffer routines for the system memory 116 for the caching of disk data. A description of UFS may be found in chapters 2, 6, 7 and 8 of "Kernel Structure and Flow," by Rieken and Webb of .sh consulting (Santa Clara, Calif.: 1988), incorporated herein by reference.

When a read command is sent to the FC by a requestor such as a network controller, the FC first converts the file, offset and count information into disk and sector information. It then locks the system memory buffers which contain that information, instructing the storage processor 114 to read them from disk if necessary. When the buffer is ready, the FC returns a message to the requestor containing both the attributes of the designated file and an array of buffer descriptors that identify the locations in system memory 116 holding the data.

After the requestor has read the data out of the buffers, it sends a release request back to the FC. The release request is the same message that was returned by the FC in response to the read request; the FC 112a uses the information contained therein to determine which buffers to free.

A write command is processed by FC 112a similarly to the read command, but the caller is expected to write to (instead of read from) the locations in system memory 116 identified by the buffer descriptors returned by the FC 112a. Since FC 112a employs write-through caching, when it receives the release command from the requestor, it instructs storage processor 114 to copy the data from system memory 116 onto the appropriate disk sectors before freeing the system memory buffers for possible reallocation.

The READDIR transaction is similar to read and write, but the request is satisfied by the FC 112a directly out of its own FC memory 396 after formatting the requested directory information specifically for this purpose. The FC 112a causes the storage processor read the requested directory information from disk if it is not already locally cached. Also, the specified offset is a "magic cookie" instead of a byte offset, identifying directory entries instead of an absolute byte offset into the file. No file attributes are returned.

The READLINK transaction also returns no file attributes, and since links are always read in their entirety, it does not require any offset or count.

For all of the disk data caching performed through system memory 116, the FC 112a acts as a central authority for dynamically allocating, deallocating and keeping track of buffers. If there are two or more FCs 112, each has exclusive control over its own assigned portion of system memory 116. In all of these transactions, the requested buffers are locked during the period between the initial request and the release request. This prevents corruption of the data by other clients.

Also in the situation where there are two or more FCs, each file system on the disks is assigned to a particular one of the FCs. FC #0 runs a process called FC_VICE_PRESIDENT, which maintains a list of which file systems are assigned to which FC. When a client processor (for example an NC 110) is about to make an LNFS request designating a particular file system, it first sends the fsid in a message to the FC_VICE_PRESIDENT asking which FC controls the specified file system. The FC_VICE_PRESIDENT responds, and the client processor sends the LNFS request to the designated FC. The client processor also maintains its own list of fsid/FC pairs as it discovers them, so as to minimize the number of such requests to the FC_VICE_PRESIDENT.

STORAGE PROCESSOR HARDWARE ARCHITECTURE

In the file server 100, each of the storage processors 114 can interface the VME bus 120 with up to 10 different SCSI buses. Additionally, it can do so at the full usage rate of an enhanced block transfer protocol of 55 MB per second.

Figure 5:
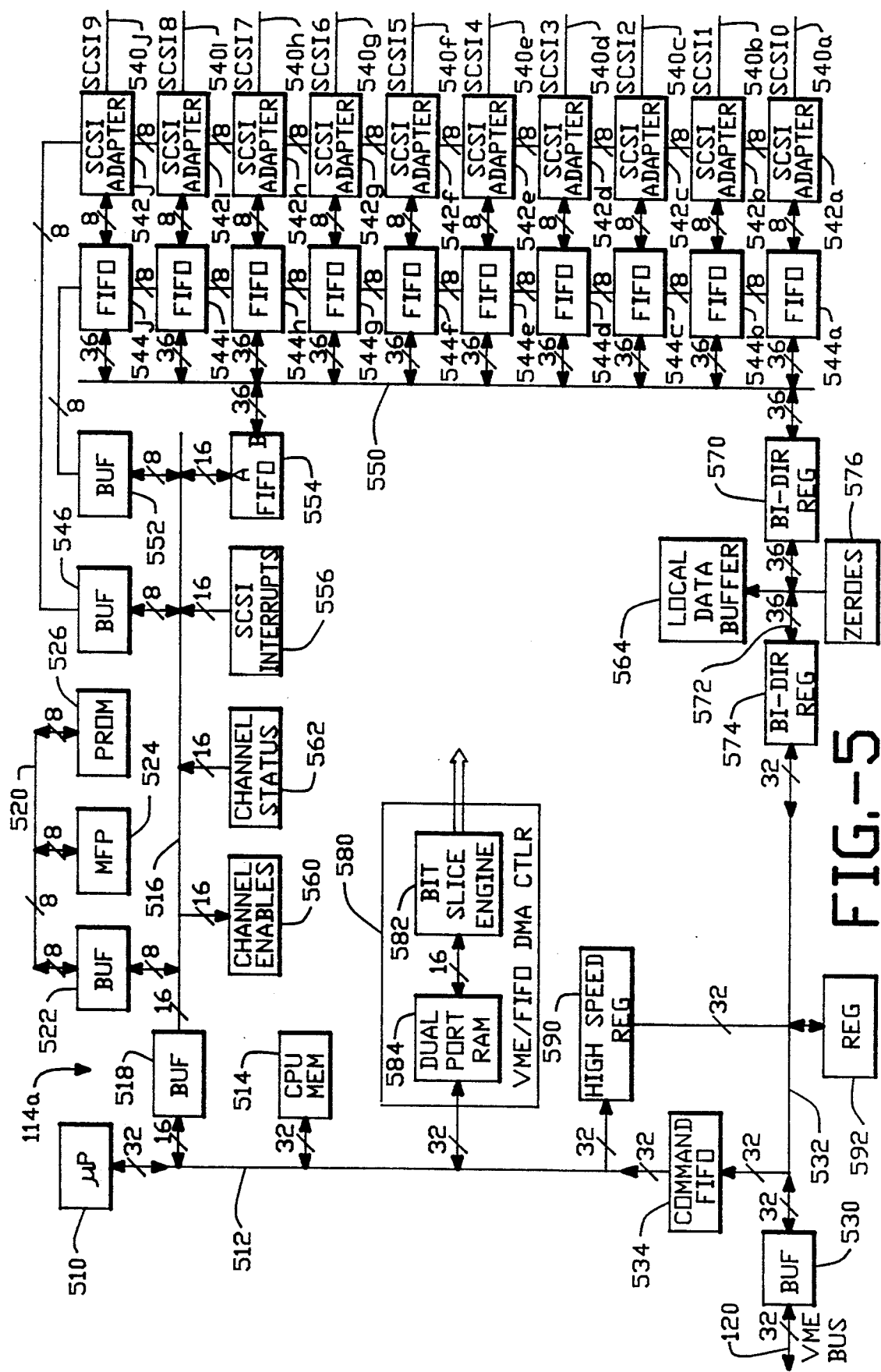
FIG. 5 is a block diagram of one of the storage processors shown in FIG. 2.

FIG. 5 is a block diagram of one of the SPs 114a. SP 114b is identical. SP 114a comprises a microprocessor 510, which may be a Motorola 68020 microprocessor operating at 20 MHz. The microprocessor 510 is coupled over a 32-bit microprocessor data bus 512 with CPU memory 514, which may include up to 1 MB of static RAM. The microprocessor 510 accesses instructions, data and status on its own private bus 512, with no contention from any other source. The microprocessor 510 is the only master of bus 512.

The low order 16 bits of the microprocessor data bus 512 interface with a control bus 516 via a bidirectional buffer 518. The low order 8 bits of the control bus 516 interface with a slow speed bus 520 via another bidirectional buffer 522. The slow speed bus 520 connects to an MFP 524, similar to the MFP 224 in NC 110a (FIG. 3), and with a PROM 526, similar to PROM 220 on NC 110a. The PROM 526 comprises 128K bytes of EPROM which contains the functional code for SP 114a. Due to the width and speed of the EPROM 526, the functional code is copied to CPU memory 514 upon reset for faster execution.

MFP 524, like the MFP 224 on NC 110a, comprises a Motorola 68901 multifunction peripheral device. It provides the functions of a vectored interrupt controller, individually programmable I/O pins, four timers and a UART. The UART functions provide serial communications across an RS 232 bus (not shown in FIG. 5) for debug monitors and diagnostics. Two of the four timing functions may be used as general-purpose timers by the microprocessor 510, either independently or in cascaded fashion. A third timer function provides the refresh clock for a DMA controller described below, and the fourth timer generates the UART clock. Additional information on the MFP 524 can be found in "MC 68901 Multi-Function Peripheral Specification," by Motorola, Inc., which is incorporated herein by reference.

The eight general-purpose I/O bits provided by MFP 524 are configured according to the following table:

| Bit | Direction | Definition |
|-----|-----------|------------|
| 7 | input | Power Failure is Imminent - This functions as an early warning. |
| 6 | input | SCSI Attention - A composite of the SCSI. Attentions from all 10 SCSI channels. |
| 5 | input | Channel Operation Done - A composite of the channel done bits from all 13 channels of the DMA controller, described below. |
| 4 | output | DMA Controller Enable. Enables the DMA Controller to run. |
| 3 | input | VMEbus Interrupt Done - Indicates the completion of a VMEbus Interrupt. |
| 2 | input | Command Available - Indicates that the SP'S Command Fifo, described below, contains one or more command pointers. |
| 1 | output | External Interrupts Disable. Disables externally generated interrupts to the microprocessor 510. |
| 0 | output | Command Fifo Enable. Enables operation of the SP'S Command Fifo. Clears the Command Fifo when reset. |

Commands are provided to the SP 114a from the VME bus 120 via a bidirectional buffer 530, a local data bus 532, and a command FIFO 534. The command FIFO 534 is similar to the command FIFOs 290 and 390 on NC 110a and FC 112a, respectively, and has a depth of 256 32-bit entries. The command FIFO 534 is a write-only register as seen on the VME bus 120, and as a read-only register as seen by microprocessor 510. If the FIFO is full at the beginning of a write from the VME bus, a VME bus error is generated. Pointers are removed from the command FIFO 534 in the order received, and only by the microprocessor 510. Command available status is provided through I/O bit 4 of the MFP 524, and as a long as one or more command pointers are still within the command FIFO 534, the command available status remains asserted.

As previously mentioned, the SP 114a supports up to 10 SCSI buses or channels 540a-540j. In the typical configuration, buses 540a-540i support up to 3 SCSI disk drives each, and channel 540j supports other SCSI peripherals such as tape drives, optical disks, and so on. Physically, the SP 114a connects to each of the SCSI buses with an ultra-miniature D sub connector and round shielded cables. Six 50-pin cables provide 300 conductors which carry 18 signals per bus and 12 grounds. The cables attach at the front panel of the SP 114a and to a commutator board at the disk drive array. Standard 50-pin cables connect each SCSI device to the commutator board. Termination resistors are installed on the SP 114a.

The SP 114a supports synchronous parallel data transfers up to 5 MB per second on each of the SCSI buses 540, arbitration, and disconnect/reconnect services. Each SCSI bus 540 is connected to a respective SCSI adaptor 542, which in the present embodiment is an AIC 6250 controller IC manufactured by Adaptec Inc., Milpitas, Calif., operating in the non-multiplexed address bus mode. The AIC 6250 is described in detail in "AIC-6250 Functional Specification," by Adaptec Inc., which is incorporated herein by reference. The SCSI adaptors 542 each provide the necessary hardware interface and low-level electrical protocol to implement its respective SCSI channel.

The 8-bit data port of each of the SCSI adaptors 542 is connected to port A of a respective one of a set of ten parity FIFOs 544a-544j. The FIFOs 544 are the same as FIFOs 240, 260 and 270 on NC 110a, and are connected and configured to provide parity covered data transfers between the 8-bit data port of the respective SCSI adaptors 542 and a 36-bit (32-bit plus 4 bits of parity) common data bus 550. The FIFOs 544 provide handshake, status, word assembly/disassembly and speed matching FIFO buffering for this purpose. The FIFOs 544 also generate and check parity for the 32-bit bus, and for RAID 5 implementations they accumulate and check redundant data and accumulate recovered data.

All of the SCSI adaptors 542 reside at a single location of the address space of the microprocessor 510, as do all of the parity FIFOs 544. The microprocessor 510 selects individual controllers and FIFOs for access in pairs, by first programming a pair select register (not shown) to point to the desired pair and then reading from or writing to the control register address of the desired chip in the pair. The microprocessor 510 communicates with the control registers on the SCSI adaptors 542 via the control bus 516 and an additional bidirectional buffer 546, and communicates with the control registers on FIFOs 544 via the control bus 516 and a bidirectional buffer 552. Both the SCSI adaptors 542 and FIFOs 544 employ 8-bit control registers, and register addressing of the FIFOs 544 is arranged such that such registers alias in consecutive byte locations. This allows the microprocessor 510 to write to the registers as a single 32-bit register, thereby reducing instruction overhead.

The parity FIFOs 544 are each configured in their Adaptec 6250 mode. Referring to the Appendix, the FIFOs 544 are programmed with the following bit settings in the Data Transfer Configuration Register:

| Bit | Definition | Setting |
|-----|------------|---------|
| 0 | WD Mode | (0) |
| 1 | Parity Chip | (1) |
| 2 | Parity Correct Mode | (0) |
| 3 | 8/16 bits CPU & PortA interface | (0) |
| 4 | Invert Port A address 0 | (1) |
| 5 | Invert Port A address 1 | (1) |
| 6 | Checksum Carry Wrap | (0) |
| 7 | Reset | (0) |

The Data Transfer Control Register is programmed as follows:

| Bit | Definition | Setting |
|---|---|---|
| 0 | Enable PortA Req/Ack | (1) |
| 1 | Enable PortB Req/Ack | (1) |
| 2 | Data Transfer Direction | as desired |
| 3 | CPU parity enable | (0) |
| 4 | PortA parity enable | (1) |
| 5 | PortB parity enable | (1) |
| 6 | Checksum Enable | (0) |
| 7 | PortA Master | (0) |

In addition, bit 4 of the RAM Access Control Register (Long Burst) is programmed for 8-byte bursts.

SCSI adaptors 542 each generate a respective interrupt signal, the status of which are provided to microprocessor 510 as 10 bits of a 16-bit SCSI interrupt register 556. The SCSI interrupt register 556 is connected to the control bus 516. Additionally, a composite SCSI interrupt is provided through the MFP 524 whenever any one of the SCSI adaptors 542 needs servicing.

An additional parity FIFO 554 is also provided in the SP 114a, for message passing. Again referring to the Appendix, the parity FIFO 554 is programmed with the following bit settings in the Data Transfer Configuration Register:

| Bit | Definition | Setting |
|---|---|---|
| 0 | WD Mode | (0) |
| 1 | Parity Chip | (1) |
| 2 | Parity Correct Mode | (0) |
| 3 | 8/16 bits CPU & PortA interface | (1) |
| 4 | Invert Port A address 0 | (1) |
| 5 | Invert Port A address 1 | (1) |
| 6 | Checksum Carry Wrap | (0) |
| 7 | Reset | (0) |

The Data Transfer Control Register is programmed as follows:

| Bit | Definition | Setting |
|---|---|---|
| 0 | Enable PortA Req/Ack | (0) |
| 1 | Enable portB Req/Ack | (1) |
| 2 | Data Transfer Direction | as desired |
| 3 | CPU parity enable | (0) |
| 4 | PortA parity enable | (0) |
| 5 | PortB parity enable | (1) |
| 6 | Checksum Enable | (0) |
| 7 | PortA Master | (0) |

In addition, bit 4 of the RAM Access Control Register (Long Burst) is programmed for 8-byte bursts.

Port A of FIFO 554 is connected to the 16-bit control bus 516, and port B is connected to the common data bus 550. FIFO 554 provides one means by which the microprocessor 510 can communicate directly with the VME bus 120, as is described in more detail below.

The microprocessor 510 manages data movement using a set of 15 channels, each of which has an unique status which indicates its current state. Channels are implemented using a channel enable register 560 and a channel status register 562, both connected to the control bus 516. The channel enable register 560 is a 16-bit write-only register, whereas the channel status register 562 is a 16-bit read-only register. The two registers reside at the same address to microprocessor 510. The microprocessor 510 enables a particular channel by setting its respective bit in channel enable register 560, and recognizes completion of the specified operation by testing for a "done" bit in the channel status register 562. The microprocessor 510 then resets the enable bit, which causes the respective "done" bit in the channel status register 562 to be cleared.

The channels are defined as follows:

| CHANNEL | FUNCTION |
|---|---|
| 0:9 | These channels control data movement to and from the respective FIFOs 544 via the common data bus 550. When a FIFO is enabled and a request is received from it, the channel becomes ready. Once the channel has been serviced a status of done is generated. |
| 11:10 | These channels control data movement between a local data buffer 564, described below, and the VME bus 120. When enabled the channel becomes ready. Once the channel has been serviced a status of done is generated. |
| 12 | When enabled, this channel causes the DRAM in local data buffer 564 to be refreshed based on a clock which is generated by the MFP 524. The refresh consists of a burst of 16 rows. This channel does not generate a status of done. |
| 13 | The microprocessor's communication FIFO 554 is serviced by this channel. When enable is set and the FIFO 554 asserts a request then the channel becomes ready. This channel generates a status of done. |
| 14 | Low latency writes from microprocessor 510 onto the VME bus 120 are controlled by this channel. When this channel is enabled data is moved from a special 32 bit register, described below, onto the VME bus 120. This channel generates a done status. |
| 15 | This is a null channel for which neither a ready status nor done status is generated. |

Channels are prioritized to allow servicing of the more critical requests first. Channel priority is assigned in a descending order starting at channel 14. That is, in the event that all channels are requesting service, channel 14 will be the first one served.

The common data bus 550 is coupled via a bidirectional register 570 to a 36-bit junction bus 572. A second bidirectional register 574 connects the junction bus 572 with the local data bus 532. Local data buffer 564, which comprises 1MB of DRAM, with parity, is coupled bidirectionally to the junction bus 572. It is organized to provide 256K 32-bit words with byte parity. The SP 114a operates the DRAMs in page mode to support a very high data rate, which requires bursting of data instead of random single-word accesses. It will be seen that the local data buffer 564 is used to implement a RAID (redundant array of inexpensive disks) algorithm, and is not used for direct reading and writing between the VME bus 120 and a peripheral on one of the SCSI buses 540.

A read-only register 576, containing all zeros, is also connected to the junction bus 572. This register is used mostly for diagnostics, initialization, and clearing of large blocks of data in system memory 116.

The movement of data between the FIFOs 544 and 554, the local data buffer 564, and a remote entity such as the system memory 116 on the VME bus 120, is all controlled by a VME/FIFO DMA controller 580. The VME/FIFO DMA controller 580 is similar to the VME/FIFO DMA controller 272 on network controller 110a (FIG. 3), and is described in the Appendix. Briefly, it includes a bit slice engine 582 and a dual-port static RAM 584. One port of the dual-port static RAM 584 communicates over the 32-bit microprocessor data bus 512 with microprocessor 510, and the other port communicates over a separate 16-bit bus with the bit slice engine 582. The microprocessor 510 places command parameters in the dual-port RAM 584, and uses the channel enables 560 to signal the VME/FIFO DMA controller 580 to proceed with the command. The VME/FIFO DMA controller is responsible for scanning the channel status and servicing requests, and returning ending status in the dual-port RAM 584. The dual-port RAM 584 is organized as 1K×32 bits at the 32-bit port and as 2K×16 bits at the 16-bit port. An example showing the method by which the microprocessor 510 controls the VME/FIFO DMA controller 580 is as follows. First, the microprocessor 510 writes into the dual-port RAM 584 the desired command and associated parameters for the desired channel. For example, the command might be, "copy a block of data from FIFO 544h out into a block of system memory 116 beginning at a specified VME address." Second, the microprocessor sets the channel enable bit in channel enable register 560 for the desired channel.

At the time the channel enable bit is set, the appropriate FIFO may not yet be ready to send data. Only when the VME/FIFO DMA controller 580 does receive a "ready" status from the channel, will the controller 580 execute the command. In the meantime, the DMA controller 580 is free to execute commands and move data to or from other channels.

When the DMA controller 580 does receive a status of "ready" from the specified channel, the controller fetches the channel command and parameters from the dual-ported RAM 584 and executes. When the command is complete, for example all the requested data has been copied, the DMA controller writes status back into the dual-port RAM 584 and asserts "done" for the channel in channel status register 562. The microprocessor 510 is then interrupted, at which time it reads channel status register 562 to determine which channel interrupted. The microprocessor 510 then clears the channel enable for the appropriate channel and checks the ending channel status in the dual-port RAM 584.

In this way a high-speed data transfer can take place under the control of DMA controller 580, fully in parallel with other activities being performed by microprocessor 510. The data transfer takes place over busses different from microprocessor data bus 512, thereby avoiding any interference with microprocessor instruction fetches.

The SP 114a also includes a high-speed register 590, which is coupled between the microprocessor data bus 512 and the local data bus 532. The high-speed register 590 is used to write a single 32-bit word to an VME bus target with a minimum of overhead. The register is write only as viewed from the microprocessor 510. In order to write a word onto the VME bus 120, the mioroprocessor 510 first writes the word into the register 590, and the desired VME target address into dual-port RAM 584. When the microprocessor 510 enables the appropriate channel in channel enable register 560, the DMA controller 580 transfers the data from the register 590 into the VME bus address specified in the dual-port RAM 584. The DMA controller 580 then writes the ending status to the dual-port RAM and sets the channel "done" bit in channel status register 562.

This procedure is very efficient for transfer of a single word of data, but becomes inefficient for large blocks of data. Transfers of greater than one word of data, typically for message passing, are usually performed using the FIFO 554.

The SP 114a also includes a series of registers 592, similar to the registers 282 on NC 110a (FIG. 3) and the registers 382 on FC 112a (FIG. 4). The details of these registers are not important for an understanding of the present invention.

STORAGE PROCESSOR OPERATION

The 30 SCSI disk drives supported by each of the SPs 114 are visible to a client processor, for example one of the file controllers. 112, either as three large, logical disks or as 30 independent SCSI drives, depending on configuration. When the drives are visible as three logical disks, the SP uses RAID 5 design algorithms to distribute data for each logical drive on nine physical drives to minimize disk arm contention. The tenth drive is left as a spare. The RAID 5 algorithm (redundant array of inexpensive drives, revision 5) is described in "A Case For a Redundant Arrays of Inexpensive Disks (RAID)", by Patterson et al., published at ACM SIGMOD Conference, Chicago, Ill., Jun. 1–3, 1988, incorporated herein by reference.

In the RAID 5 design, disk data are divided into stripes. Data stripes are recorded sequentially on eight different disk drives. A ninth parity stripe, the exclusive-or of eight data stripes, is recorded on a ninth drive. If a stripe size is set to 8K bytes, a read of 8K of data involves only one drive. A write of 8K of data involves two drives: a data drive and a parity drive. Since a write requires the reading back of old data to generate a new parity stripe, writes are also referred to as modify writes. The SP 114a supports nine small reads to nine SCSI drives concurrently. When stripe size is set to 8K, a read of 64K of data starts all eight SCSI drives, with each drive reading one 8K stripe worth of data. The parallel operation is transparent to the caller client.

The parity stripes are rotated among the nine drives in order to avoid drive contention during write operations. The parity stripe is used to improve availability of data. When one drive is down, the SP 114a can reconstruct the missing data from a parity stripe. In such case, the SP 114a is running in error recovery mode. When a bad drive is repaired, the SP 114a can be instructed to restore data on the repaired drive while the system is on-line.

When the SP 114a is used to attach thirty independent SCSI drives, no parity stripe is created and the client addresses each drive directly.

The SP 114a processes multiple messages (transactions, commands) at one time, up to 200 messages per second. The SP 114a does not initiate any messages after initial system configuration. The following SP 114a operations are defined:

```
01 No Op
02 Send Configuration Data
03 Receive Configuration Data
05 Read and Write Sectors
06 Read and Write Cache Pages
07 IOCTL Operation
08 Dump SP 114a Local Data Buffer
09 Start/Stop A SCSI Drive
0C Inquiry
0E Read Message Log Buffer
0F Set SP 114a Interrupt
```

The above transactions are described in detail in the above-identified application entitled MULTIPLE FA- CILITY OPERATING SYSTEM ARCHITECTURE. For and understanding of the invention, it will be useful to describe the function and operation of only two of these commands: read and write sectors, and read and write cache pages.

Read and Write Sectors

This command, issued usually by an FC 112, causes the SP 114a to transfer data between a specified block of system memory and a specified series of contiguous sectors on the SCSI disks. As previously described in connection with the file controller 112, the particular sectors are identified in physical terms. In particular, the particular disk sectors are identified by SCSI channel number (0-9), SCSI ID on that channel number (0-2), starting sector address on the specified drive, and a count of the number of sectors to read or write. The SCSI channel number is zero if the SP 114a is operating under RAID 5.

The SP 114a can execute up to 30 messages on the 30 SCSI drives simultaneously. Unlike most of the commands to an SP 114, which are processed by microprocessor 510 as soon as they appear on the command FIFO 534, read and write sectors commands (as well as read and write cache memory commands) are first sorted and queued. Hence, they are not served in the order of arrival.

When a disk access command arrives, the microprocessor 510 determines which disk drive is targeted and inserts the message in a queue for that disk drive sorted by the target sector address. The microprocessor 510 executes commands on all the queues simultaneously, in the order present in the queue for each disk drive. In order to minimize disk arm movements, the microprocessor 510 moves back and forth among queue entries in an elevator fashion.

If no error conditions are detected from the SCSI disk drives, the command is completed normally. When a data check error condition occurs and the SP 114a is configured for RAID 5, recovery actions using redundant data begin automatically. When a drive is down while the SP 114a is configured for RAID 5, recovery actions similar to data check recovery take place.

Read/Write Cache Pages

This command is similar to read and write sectors, except that multiple VME addresses are provided for transferring disk data to and from system memory 116. Each VME address points to a cache page in system memory 116, the size of which is also specified in the command. When transferring data from a disk to system memory 116, data are scattered to different cache pages; when writing data to a disk, data are gathered from different cache pages in system memory 116. Hence, this operation is referred to as a scatter-gather function.

The target sectors on the SCSI disks are specified in the command in physical terms, in the same manner that they are specified for the read and write sectors command. Termination of the command with or without error conditions is the same as for the read and write sectors command.

The dual-port RAM 584 in the DMA controller 580 maintains a separate set of commands for each channel controlled by the bit slice engine 582. As each channel completes its previous operation, the microprocessor 510 writes a new DMA operation into the dual-port RAM 584 for that channel in order to satisfy the next operation on a disk elevator queue.

The commands written to the DMA controller 580 include an operation code and a code indicating whether the operation is to be performed in non-block mode, in standard VME block mode, or in enhanced block mode. The operation codes supported by DMA controller 580 are as follows:

| OP CODE | OPERATION | |
|---|---|---|
| 0 | NO-OP | |
| 1 | ZEROES → BUFFER | Move zeros from zeros register 576 to local data buffer 564. |
| 2 | ZEROES → FIFO | Move zeros from zeros register 576 to the currently selected FIFO on common data bus 550. |
| 3 | ZEROES → VMEbus | Move zeros from zeros register 576 out onto the VME bus 120. Used for initializing cache buffers in system memory 116. |
| 4 | VMEbus → BUFFER | Move data from the VME bus 120 to the local data buffer 564. This operation is used during a write, to move target data intended for a down drive into the buffer for participation in redundancy generation. Used only for RAID 5 application. |
| 5 | VMEbus → FIFO | New data to be written from VME bus onto a drive. Since RAID 5 requires redundancy data to be generated from data that is buffered in local data buffer 564, this operation will be used only if the SP 114a is not configured for RAID 5. |
| 6 | VMEbus → BUFFER & FIFO | Target data is moved from VME bus 120 to a SCSI device and is also captured in the local data buffer 564 for participation in redundancy generation. Used only if SP 114a is configured for RAID 5 operation. |
| 7 | BUFFER → VMEbus | This operation is not used. |
| 8 | BUFFER → FIFO | Participating data is transferred to create redundant data or recovered data on a disk drive. Used only in RAID 5 applications. |
| 9 | FIFO → VMEbus | This operation is used to move target data directly from a disk drive onto the VME bus 120. |
| A | FIFO → BUFFER | Used to move participating data for recovery and modify operations. Used only in RAID 5 applications. |
| B | FIFO → VMEbus & BUFFER | This operation is used to save target data for participation in data recovery. Used only in RAID 5 applications. |

SYSTEM MEMORY

Figure 6:
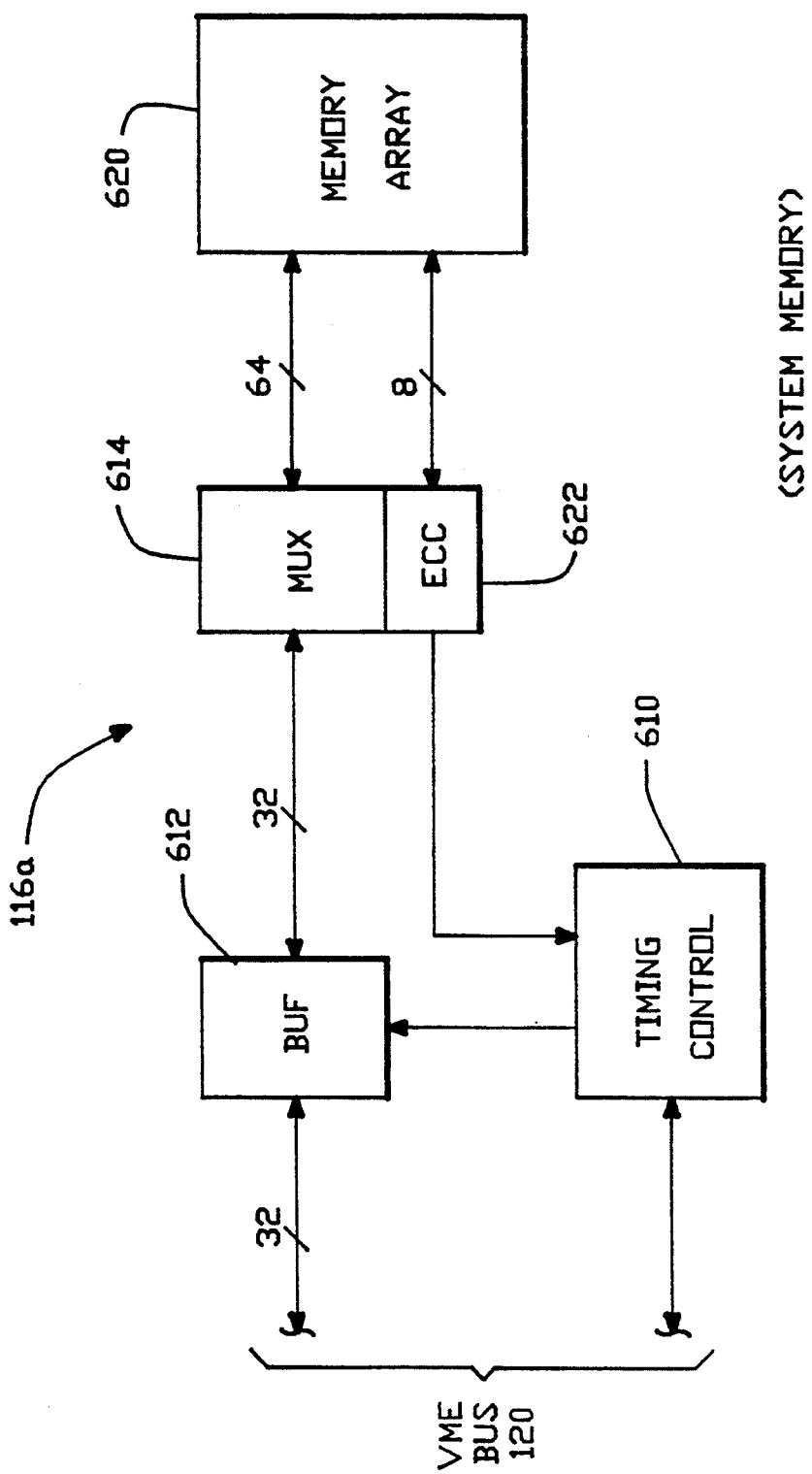
FIG. 6 is a block diagram of one of the system memory cards shown in FIG. 2.

FIG. 6 provides a simplified block diagram of the preferred architecture of one of the system memory cards 116a. Each of the other system memory cards are the same. Each memory card 116 operates as a slave on the enhanced VME bus 120 and therefore requires no on-board CPU. Rather, a timing control block 610 is sufficient to provide the necessary slave control operations. In particular, the timing control block 610, in response to control signals from the control portion of the enhanced VME bus 120, enables a 32-bit wide buffer 612 for an appropriate direction transfer of 32-bit data between the enhanced VME bus 120 and a multiplexer unit 614. The multiplexer 614 provides a multiplexing and demultiplexing function, depending on data transfer direction, for a six megabit by seventy-two bit word memory array 620. An error correction code (ECC) generation and testing unit 622 is also connected to the multiplexer 614 to generate or verify, again depending on transfer direction, eight bits of ECC data. The status of ECC verification is provided back to the timing control block 610.

ENHANCED VME BUS PROTOCOL

VME bus 120 is physically the same as an ordinary VME bus, but each of the NCs and SPs include additional circuitry and firmware for transmitting data using an enhanced VME block transfer protocol. The enhanced protocol is described in detail in the above-identified application entitled ENHANCED VMEBUS PROTOCOL UTILIZING PSEUDOSYNCHRONOUS HANDSHAKING AND BLOCK MODE DATA TRANSFER, and summarized in the Appendix hereto. Typically transfers of LNFS file data between NCs and system memory, or between SPs and system memory, and transfers of packets being routed from one NC to another through system memory, are the only types of transfers that use the enhanced protocol in server 100. All other data transfers on VME bus 120 use either conventional VME block transfer protocols or ordinary non-block transfer protocols.

MESSAGE PASSING

As is evident from the above description, the different processors in the server 100 communicate with each other via certain types of messages. In software, these messages are all handled by the messaging kernel, described in detail in the MULTIPLE FACILITY OPERATING SYSTEM ARCHITECTURE application cited above. In hardware, they are implemented as follows.

Each of the NCs 110, each of the FCs 112, and each of the SPs 114 includes a command or communication FIFO such as 290 on NC 110a. The host 118 also includes a command FIFO, but since the host is an unmodified purchased processor board, the FIFO is emulated in software. The write port of the command FIFO in each of the processors is directly addressable from any of the other processors over VME bus 120.

Similarly, each of the processors except SPs 114 also includes shared memory such as CPU memory 214 on NC 110a. This shared memory is also directly addressable by any of the other processors in the server 100.

If one processor, for example network controller 110a, is to send a message or command to a second processor, for example file controller 112a, then it does so as follows. First, it forms the message in its own shared memory (e.g., in CPU memory 214 on NC 110a). Second, the microprocessor in the sending processor directly writes a message descriptor into the command FIFO in the receiving processor. For a command being sent from network controller 110a to file controller 112a, the microprocessor 210 would perform the write via buffer 284 on NC 110a, VME bus 120, and buffer 384 on file controller 112a.

The command descriptor is a single 32-bit word containing in its high order 30 bits a VME address indicating the start of a quad-aligned message in the sender's shared memory. The low order two bits indicate the message type as follows:

| Type | Description |
|------|-------------|
| 0 | Pointer to a new message being sent |
| 1 | Pointer to a reply message |
| 2 | Pointer to message to be forwarded |
| 3 | Pointer to message to be freed; also message acknowledgment |

All messages are 128-bytes long.

When the receiving processor reaches the command descriptor on its command FIFO, it directly accesses the sender's shared memory and copies it into the receiver's own local memory. For a command issued from network controller 110a to file controller 112a, this would be an ordinary VME block or non-block mode transfer from NC CPU memory 214, via buffer 284, VME bus 120 and buffer 384, into FC CPU memory 314. The FC microprocessor 310 directly accesses NC CPU memory 214 for this purpose over the VME bus 120.

When the receiving processor has received the command and has completed its work, it sends a reply message back to the sending processor. The reply message may be no more than the original command message unaltered, or it may be a modified version of that message or a completely new message. If the reply message is not identical to the original command message, then the receiving processor directly accesses the original sender's shared memory to modify the original command message or overwrite it completely. For replies from the FC 112a to the NC 110a, this involves an ordinary VME block or non-block mode transfer from the FC 112a, via buffer 384, VME bus 120, buffer 284 and into NC CPU memory 214. Again, the FC microprocessor 310 directly accesses NC CPU memory 214 for this purpose over the VME bus 120.

Whether or not the original command message has been changed, the receiving processor then writes a reply message descriptor directly into the original sender's command FIFO. The reply message descriptor contains the same VME address as the original command message descriptor, and the low order two bits of the word are modified to indicate that this is a reply message. For replies from the FC 112a to the NC 110a, the message descriptor write is accomplished by microprocessor 310 directly accessing command FIFO 290 via buffer 384, VME bus 120 and buffer 280 on the NC. Once this is done, the receiving processor can free the buffer in its local memory containing the copy of the command message.

When the original sending processor reaches the reply message descriptor on its command FIFO, it wakes up the process that originally sent the message and permits it to continue. After examining the reply message, the original sending processor can free the original command message buffer in its own local shared memory.

As mentioned above, network controller 110a uses the buffer 284 data path in order to write message descriptors onto the VME bus 120, and uses VME/FIFO DMA controller 272 together with parity FIFO 270 in order to copy messages from the VME bus 120 into CPU memory 214. Other processors read from CPU memory 214 using the buffer 284 data path.

File controller 112a writes message descriptors onto the VME bus 120 using the buffer 384 data path, and copies messages from other processors' shared memory via the same data path. Both take place under the control of microprocessor 310. Other processors copy messages from CPU memory 314 also via the buffer 384 data path.

Storage processor 114a writes message descriptors onto the VME bus using high-speed register 590 in the manner described above, and copies messages from other processors using DMA controller 580 and FIFO 554. The SP 114a has no shared memory, however, so it uses a buffer in system memory 116 to emulate that function. That is, before it writes a message descriptor into another processor's command FIFO, the SP 114a first copies the message into its own previously allocated buffer in system memory 116 using DMA controller 580 and FIFO 554. The VME address included in the message descriptor then reflects the VME address of the message in system memory 116.

In the host 118, the command FIFO and shared memory are both emulated in software.

The invention has been described with respect to particular embodiments thereof, and it will be understood that numerous modifications and variations are possible within the scope of the invention.

APPENDIX A

VME/FIFO DMA Controller

In storage processor 114a, DMA controller 580 manages the data path under the direction of the microprocessor 510. The DMA controller 580 is a microcoded 16-bit bit-slice implementation executing pipelined instructions at a rate of one each 62.5 ns. It is responsible for scanning the channel status 562 and servicing request with parameters stored in the dual-ported ram 584 by the microprocessor 510. Ending status is returned in the ram 584 and interrupts are generated for the microprocessor 510.

Control Store. The control store contains the microcoded instructions which control the DMA controller 580. The control store consists of 6 1K×8 proms configured to yield a 1K×48 bit microword. Locations within the control store are addressed by the sequencer and data is presented at the input of the pipeline registers.

Sequencer. The sequencer, controls program flow by generating control store addresses based upon pipeline data and various status bits. The control store address consists of 10 bits. Bits 8:0 of the control store address derive from a multiplexer having as its inputs either an ALU output or the output of an incrementer. The incrementer can be preloaded with pipeline register bits 8:0, or it can be incremented as a result of a test condition. The 1K address range is divided into two pages by a latched flag such that the microprogram can execute from either page. Branches, however remain within the selected page. Conditional sequencing is performed by having the test condition increment the pipeline provided address. A false condition allows execution from the pipeline address while a true condition causes execution from the address +1. The alu output is selected as an address source in order to directly vector to a routine or in order to return to a calling routine. Note that when calling a subroutine the calling routine must reside within the same page as the subroutine or the wrong page will be selected on the return.

ALU. The alu comprises a single IDT49C402A integrated circuit. It is 16 bits in width and most closely resembles four 2901s with 64 registers. The alu is used primarily for incrementing, decrementing, addition and bit manipulation. All necessary control signals originate in the control store. The IDT HIGH PERFORMANCE CMOS 1988 DATA BOOK, incorporated by reference herein, contains additional information about the alu.

Microword. The 48 bit microword comprises several fields which control various functions of the DMA controller 580. The format of the microword is defined below along with mnemonics and a description of each function.

| | | |
|---|---|---|
| AI<8:0> | 47:39 | (Alu Instruction bits 8:0) The AI bits provide the instruction for the 49C402A alu. Refer to the IDT data book for a complete definition of the alu instructions. Note that the I9 signal input of the 49C402A is always low. |
| CIN | 38 | (Carry INput) This bit forces the carry input to the alu. |
| RA<5:0> | 37:32 | (Register A address bits 5:0) These bits select one of 64 registers as the "A" operand for the alu. These bits also provide literal bits 15:10 for the alu bus. |
| RB<5:0> | 31:26 | (Register B address bits 5:0) These bits select one of 64 registers as the "B" operand for the alu. These bits also provide literal bits 9:4 for the alu bus. |
| LFD | 25 | (Latched Flag Data) When set this bit causes the selected latched flag to be set. When reset this bit causes the selected latched flag to be cleared. This bits also functions as literal bit 3 for the alu bus. |
| LFS<2:0> | 24:22 | (Latched Flag Select bits 2:0) The meaning of these bits is dependent upon the selected source for the alu bus. In the event that the literal field is selected as the bus source then LFS<2:0> function as literal bits <2:0> otherwise the bits are used to select one of the latched flags. |

| LFS<2:0> | SELECTED FLAG |
|---|---|
| 0 | This value selects a null flag. |
| 1 | When set this bit enables the buffer clock. When reset this bit disables the buffer clock. |
| 2 | When this bit is cleared VME bus transfers, buffer operations and RAS are all disabled. |
| 3 | NOT USED |
| 4 | When set this bit enables VME bus transfers. |
| 5 | When set this bit enables buffer operations. |
| 6 | When set this bit asserts the row address strobe to the |

-continued

| | | |
|---|---|---|
| | | dram buffer. |
| | 7 | When set this bit selects page 0 of the control store. |
| SRC<1,0> | 20,21 | (alu bus SouRCe select bits 1,0) These bits select the data source to be enabled onto the alu bus. |

| SRC<1,0> | Selected Source |
|---|---|
| 0 | alu |
| 1 | dual ported ram |
| 2 | literal |
| 3 | reserved-not defined |

| | | |
|---|---|---|
| PF<2:0> | 19:17 | (Pulsed Flag select bits 2:0) These bits select a flag/signal to be pulsed. |

| PF<2:0> | Flag |
|---|---|
| 0 | null |
| 1 | SGL_CLK generates a single transition of buffer clock. |
| 2 | SET_VB forces vme and buffer enable to be set. |
| 3 | CL_PERR clears buffer parity error status. |
| 4 | SET_DN set channel done status for the currently selected channel. |
| 5 | INC_ADR increment dual ported ram address. |
| 6:7 | RESERVED - NOT DEFINED |

| | | |
|---|---|---|
| DEST<3:0> | 16:13 | (DESTination select bits 3:0) These bits select one of 10 destinations to be loaded from the alu bus. |

| DEST<3:0> | Destination |
|---|---|
| 0 | null |
| 1 | WR_RAM causes the data on the alu bus to be written to the dual ported ram. D<15:0> -> ram<15:0> |
| 2 | WR_BADD loads the data from the alu bus into the dram address counters. D<14:7> -> mux addr<8:0> |
| 3 | WR_VADL loads the data from the alu bus into the least significant 2 bytes of the VME address register. D<15:2> -> VME addr<15:2> D1 -> ENB_ENH D0 -> ENB_BLK |
| 4 | WR_VADH loads the most significant 2 bytes of the VME address register. D<15:0> -> VME addr<31:16> |
| 5 | WR_RADD loads the dual ported ram address counters. D<10:0> -> ram addr <10:0> |
| 6 | WR_WCNT loads the word counters. D15 -> count enable* D<14:8> -> count <6:0> |
| 7 | WR_CO loads the co-channel select register. D<7:4> -> CO<3:0> |
| 8 | WR_NXT loads the next-channel select register. D<3:0> -> NEXT<3:0> |
| 9 | WR_CUR loads the current-channel select register. D<3:0> -> CURR <3:0> |
| 10:14 | RESERVED - NOT DEFINED |
| 15 | JUMP causes the control store sequencer to select the alu data bus. D<8:0> -> CS_A<8:0> |

| | | |
|---|---|---|
| TEST<3:0> | 12:9 | (TEST condition select bits 3:0) Select one of 16 inputs to the test multiplexor to be used as the carry input to the incrementer. |

| TEST<3:0> | Condition | |
|---|---|---|
| 0 | FALSE | -always false |
| 1 | TRUE | -always true |
| 2 | ALU_COUT | -carry output of alu |
| 3 | ALU_EQ | -equals output of alu |
| 4 | ALU_OVR | -alu overflow |
| 5 | ALU_NEG | -alu negative |
| 6 | XFR_DONE | -transfer complete |
| 7 | PAR_ERR | -buffer parity error |
| 8 | TIMOUT | -bus operation timeout |
| 9 | ANY_ERR | -any error status |
| 14:10 | RESERVED | -NOT DEFINED |
| 15 | CH_RDY | -next channel ready |

| | | |
|---|---|---|
| NEXT_A<8:0> | 8:0 | (NEXT Address bits 8:0) Selects an instructions from the current page of the control store for execution. |

Dual Ported Ram. The dual ported ram is the medium by which command, parameters and status are communicated between the DMA controller 580 and the microprocessor 510. The ram is organized as 1K×32 at the master port and as 2K×16 at the DMA port. The ram may be both written and read at either port.

The ram is addressed by the DMA controller 580 by loading an 11 bit address into the address counters. Data is then read into bidirectional registers and the address counter is incremented to allow read of the next location.

Writing the ram is accomplished by loading data from the processor into the registers after loading the ram address. Successive writes may be performed on every other processor cycle.

The ram contains current block pointers, ending status, high speed bus address and parameter blocks. The following is the format of the ram:

| OFFSET | 31 | | 0 |
|---|---|---|---|
| 0 | | CURR POINTER 0 | STATUS 0 |
| 4 | | INITIAL POINTER 0 | |
| | | | |
| 58 | | CURR POINTER B | STATUS B |
| 5C | | INITIAL POINTER B | |
| 60 | | not used | not used |
| 64 | | not used | not used |
| 68 | | CURR POINTER D | STATUS D |
| 6C | | INITIAL POINTER D | |
| 70 | | not used | STATUS E |
| 74 | | HIGH SPEED BUS ADDRESS 31:2\|0\|0 | |
| 78 | | PARAMETER BLOCK 0 | |
| · | | · | |
| ?? | | PARAMETER BLOCK n | |

The Initial Pointer is a 32 bit value which points the first command block of a chain. The current pointer is a sixteen bit value used by the DMA controller 580 to point to the current command block. The current command block pointer should be initialized to 0×0000 by the microprocessor 510 before enabling the channel. Upon detecting a value of 0×0000 in the current block pointer the DMA controller 580 will copy the lower 16 bits from the initial pointer to the current pointer. Once the DMA controller 580 has completed the specified operations for the parameter block the current pointer will be updated to point to the next block. In the event that no further parameter blocks are available the pointer will be set to 0×0000.

The status byte indicates the ending status for the last channel operation performed. The following status bytes are defined:

| STATUS | MEANING |
|---|---|
| 0 | NO ERRORS |
| 1 | ILLEGAL OP CODE |
| 2 | BUS OPERATION TIMEOUT |
| 3 | BUS OPERATION ERROR |
| 4 | DATA PATH PARITY ERROR |

The format of the parameter block is:

| OFFSET | 31 | | | 0 |
|---|---|---|---|---|
| 0 | | FORWARD LINK | | |
| 4 | | NOT USED | | WORD COUNT |
| 8 | | VME ADDRESS 31:2, ENH, BLK | | |
| C | | TERM 0 \| OP 0 \| BUF ADDR 0 | | |
| · | | · | | |
| C+(4Xn) | | TERM n \| OP n \| BUF ADDR n | | |

FORWARD LINK—The forward link points to the first word of the next parameter block for execution. It allows several parameter blocks to be initialized and chained to create a sequence of operations for execution. The forward pointer has the following format:
A31:A2,0,0

The format dictates that the parameter block must start on a quad byte boundary. A pointer of 0×00000000 is a special case which indicates no forward link exists.

WORD COUNT—The word count specifies the number of quad byte words that are to be transferred to or from each buffer address or to/from the VME address. A word count of 64K words may be specified by initializing the word count with the value of 0. The word count has the following format:
|D15|D14|D13|D12|D11|D10|D9|D8|
|D7|D6|D5|D4|D3|D2|D1|D0|

The word count is updated by the DMA controller 580 at the completion of a transfer to/from the last specified buffer address. Word count is not updated after transferring to/from each buffer address and is therefore not an accurate indicator of the total data moved to/from the buffer. Word count represents the amount of data transferred to the VME bus or one of the FIFOs 544 or 554.

VME ADDRESS—The VME address specifies the starting address for data transfers. Thirty bits allows the address to start at any quad byte boundary.

ENH—This bit when set selects the enhanced block transfer protocol described in the above-cited ENHANCED VMEBUS PROTOCOL UTILIZING PSEUDOSYNCHRONOUS HANDSHAKING AND BLOCK MODE DATA TRANSFER application, to be used during the VME bus transfer. Enhanced protocol will be disabled automatically when performing any transfer to or from 24 bit or 16 bit address space, when the starting address is not 8 byte aligned or when the word count is not even.

BLK—This bit when set selects the conventional VME block mode protocol to be used during the VME bus transfer. Block mode will be disabled automatically when performing any transfer to or from 16 bit address space.

BUF ADDR—The buffer address specifies the starting buffer address for the adjacent operation. Only 16 bits are available for a 1M byte buffer and as a result the starting address always falls on a 16 byte boundary. The programmer must ensure that the starting address is on a modulo 128 byte boundary. The buffer address is updated by the DMA controller 580 after completion of each data burst.
|A19|A18|A17|A16|A15|A14|A13|A12|
|A11|A10|A9|A8|A7|A6|A5|A4|

TERM—The last buffer address and operation within a parameter block is identified by the terminal bit. The DMA controller 580 continues to fetch buffer addresses and operations to perform until this bit is encountered. Once the last operation within the parameter block is executed the word counter is updated and if not equal to zero the series of operations is repeated. Once the word counter reaches zero the forward link pointer is used to access the next parameter block.
|0|0|0|0|0|0|0|0|T|

OP—Operations are specified by the op code. The op code byte has the following format:
|0|0|0|0|OP3|OP2|OP1|OP0|

The op codes are listed below ("FIFO" refers to any of the FIFOs 544 or 554):

| OP CODE | OPERATION |
|---|---|
| 0 | NO-OP |
| 1 | ZEROES -> BUFFER |
| 2 | ZEROES -> FIFO |
| 3 | ZEROES -> VMEbus |
| 4 | VMEbus -> BUFFER |
| 5 | VMEbus -> FIFO |
| 6 | VMEbus -> BUFFER & FIFO |
| 7 | BUFFER -> VMEbus |
| 8 | BUFFER -> FIFO |
| 9 | FIFO -> VMEbus |
| A | FIFO -> BUFFER |
| B | FIFO -> VMEbus & BUFFER |

| OP CODE | OPERATION |
|---------|-----------|
| C | RESERVED |
| D | RESERVED |
| E | RESERVED |
| F | RESERVED |

APPENDIX B

Enhanced VME Block Transfer Protocol

The enhanced VME block transfer protocol is a VMEbus compatible pseudo-synchronous fast transfer handshake protocol for use on a VME backplane bus having a master functional module and a slave functional module logically interconnected by a data transfer bus. The data transfer bus includes a data strobe signal line and a data transfer acknowledge signal line. To accomplish the handshake, the master transmits a data strobe signal of a given duration on the data strobe line. The master then awaits the reception of a data transfer acknowledge signal from the slave module on the data transfer acknowledge signal line. The slave then responds by transmitting data transfer acknowledge signal of a given duration on the data transfer acknowledge signal line.

Consistent with the pseudo-synchronous nature of the handshake protocol, the data to be transferred is referenced to only one signal depending upon whether the transfer operation is a READ or WRITE operation. In transferring data from the master functional unit to the slave, the master broadcasts the data to be transferred. The master asserts a data strobe signal and the slave, in response to the data strobe signal, captures the data broadcast by the master. Similarly, in transferring data from the slave to the master, the slave broadcasts the data to be transferred to the master unit. The slave then asserts a data transfer acknowledge signal and the master, in response to the data transfer acknowledge signal, captures the data broadcast by the slave.

The fast transfer protocol, while not essential to the present invention, facilitates the rapid transfer of large amounts of data across a VME backplane bus by substantially increasing the data transfer rate. These data rates are achieved by using a handshake wherein the data strobe and data transfer acknowledge signals are functionally decoupled and by specifying high current drivers for all data and control lines.

The enhanced pseudo-synchronous method of data transfer (hereinafter referred to as "fast transfer mode") is implemented so as to comply and be compatible with the IEEE VME backplane bus standard. The protocol utilizes user-defined address modifiers, defined in the VMEbus standard, to indicate use of the fast transfer mode. Conventional VMEbus functional units, capable only of implementing standard VMEbus protocols, will ignore transfers made using the fast transfer mode and, as a result, are fully compatible with functional units capable of implementing the fast transfer mode.

The fast transfer mode reduces the number of bus propagations required to accomplish a handshake from four propagations, as required under conventional VMEbus protocols, to only two bus propagations. Likewise, the number of bus-propagations required to effect a BLOCK READ or BLOCK WRITE data transfer is reduced. Consequently, by reducing the propagations across the VMEbus to accomplish handshaking and data transfer functions, the transfer rate is materially increased.

The enhanced protocol is described in detail in the above-cited ENHANCED VMEBUS PROTOCOL application, and will only be summarized here. Familiarity with the conventional VME bus standards is assumed.

In the fast transfer mode handshake protocol, only two bus propagations are used to accomplish a handshake, rather than four as required by the conventional protocol. At the initiation of a data transfer cycle, the master will assert and deassert DS0* in the form of a pulse of a given duration. The deassertion of DS0* is accomplished without regard as to whether a response has been received from the slave. The master then waits for an acknowledgement from the slave. Subsequent pulsing of DS0* cannot occur until a responsive DTACK* signal is received from the slave. Upon receiving the slave's assertion of DTACK*, the master can then immediately reassert data strobe, if so desired. The fast transfer mode protocol does not require the master to wait for the deassertion of DTACK* by the slave as a condition precedent to subsequent assertions of DS0*. In the fast transfer mode, only the leading edge (i.e., the assertion) of a signal is significant. Thus, the deassertion of either DS0* or DTACK* is completely irrelevant for completion of a handshake. The fast transfer protocol does not employ the DS1* line for data strobe purposes at all.

The fast transfer mode protocol may be characterized as pseudo-synchronous as it includes both synchronous and asynchronous aspects. The fast transfer mode protocol is synchronous in character due to the fact that DS0* is asserted and deasserted without regard to a response from the slave. The asynchronous aspect of the fast transfer mode protocol is attributable to the fact that the master may not subsequently assert DS0* until a response to the prior strobe is received from the slave. Consequently, because the protocol includes both synchronous and asynchronous components, it is most accurately classified as "pseudo-synchronous."

The transfer of data during a BLOCK WRITE cycle in the fast transfer protocol is referenced only to DS0*. The master first broadcasts valid data to the slave, and then asserts DS0 to the slave. The slave is given a predetermined period of time after the assertion of DS0* in which to capture the data. Hence, slave modules must be prepared to capture data at any time, as DTACK* is not referenced during the transfer cycle.

Similarly, the transfer of data during a BLOCK READ cycle in the fast transfer protocol is referenced only to DTACK*. The master first asserts DS0*. The slave then broadcasts data to the master and then asserts DTACK*. The master is given a predetermined period of time after the assertion of DTACK in which to capture the data. Hence, master modules must be prepared to capture data at any time as DS0 is not referenced during the transfer cycle.

Figure 7A:
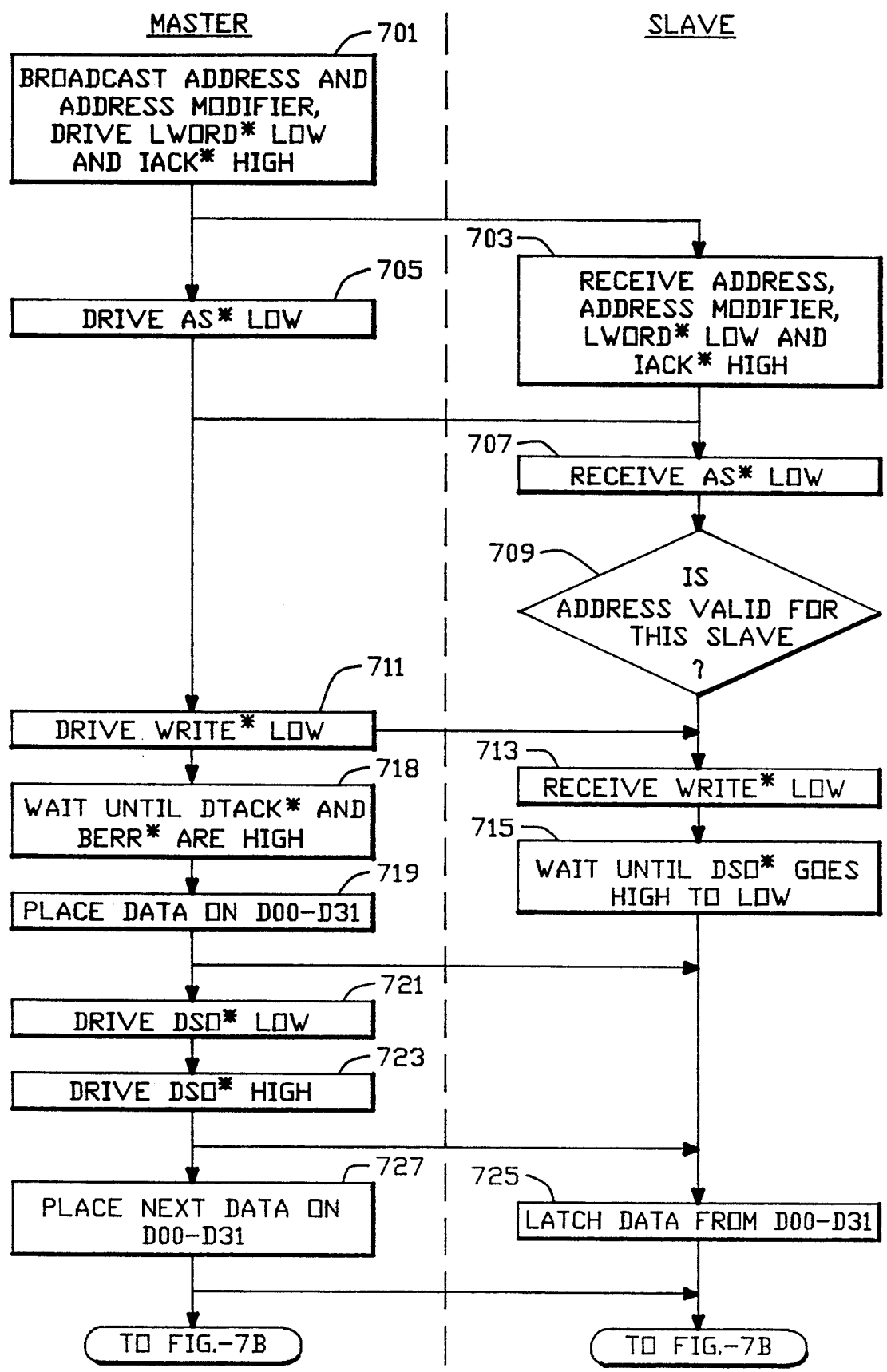
FIGS. 7A-C are a flowchart illustrating the operation of a fast transfer protocol BLOCK WRITE cycle.
Figure 7B:
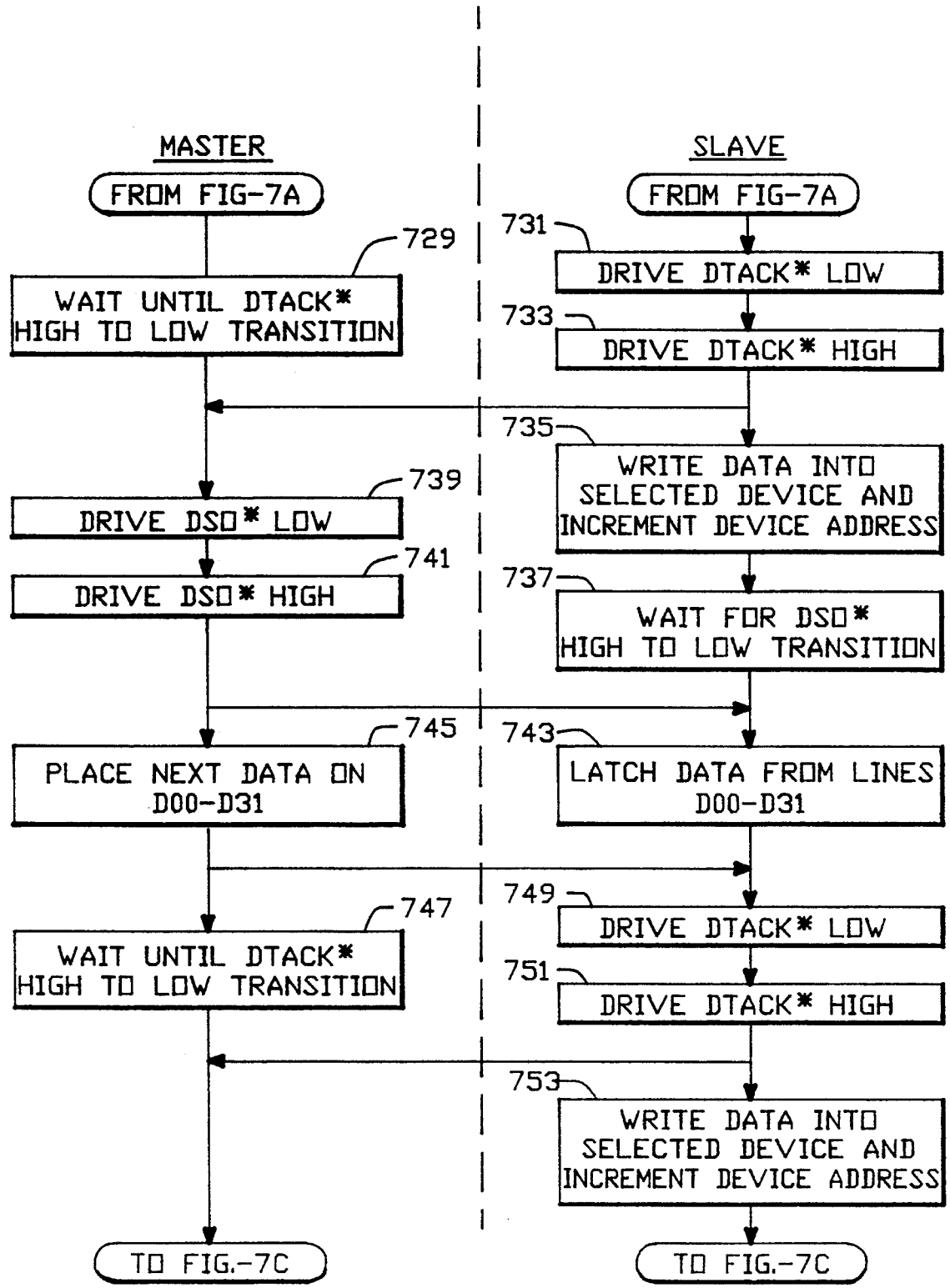
Figure 7C:
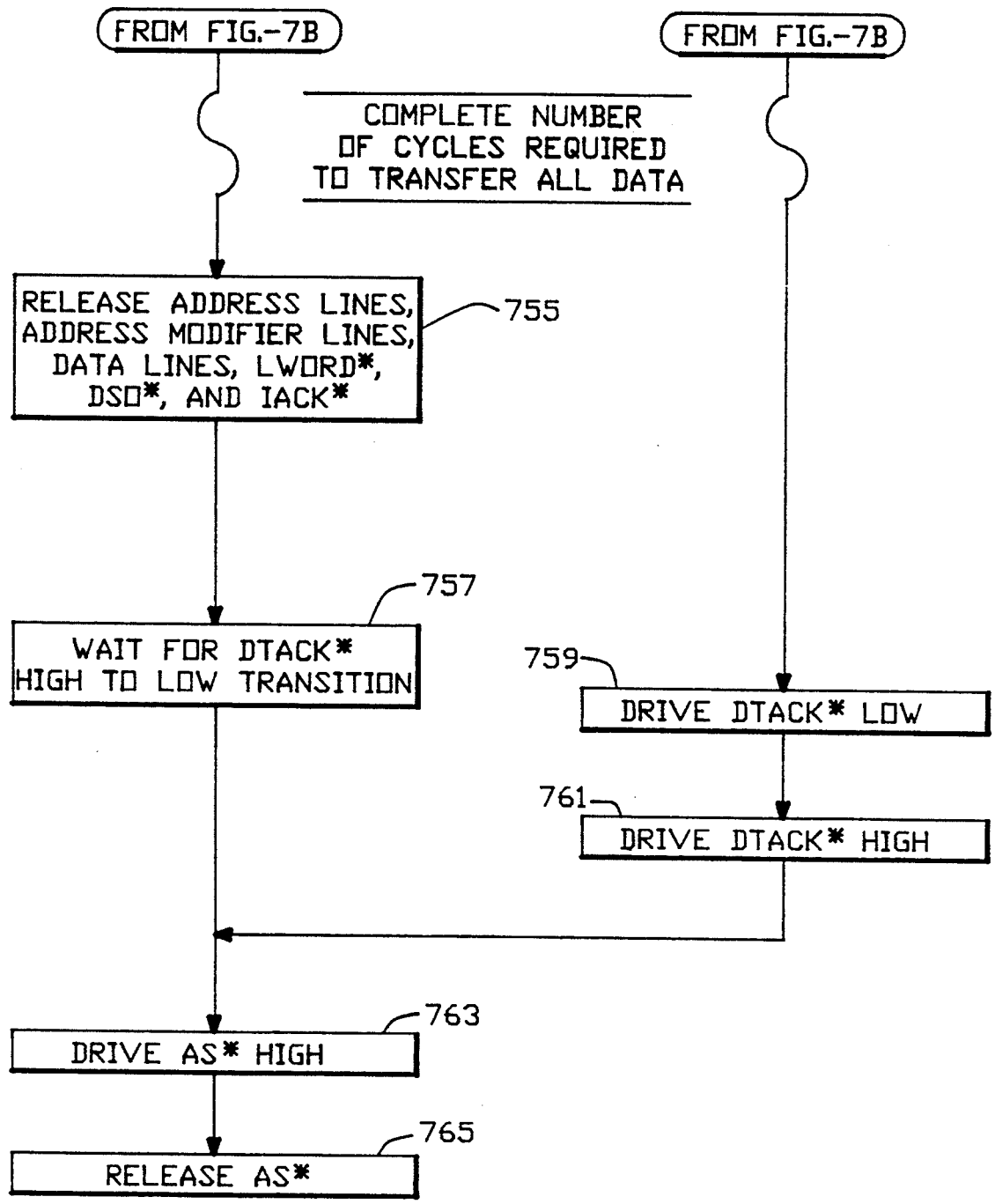

FIG. 7, parts A through C, is a flowchart illustrating the operations involved in accomplishing the fast transfer protocol BLOCK WRITE cycle. To initiate a BLOCK WRITE cycle, the master broadcasts the memory address of the data to be transferred and the address modifier across the DTB bus. The master also drives interrupt acknowledge signal (IACK*) high and the LWORD* signal low 701. A special address modifier, for example "1F," broadcast by the master indicates to the slave module that the fast transfer protocol will be used to accomplish the BLOCK WRITE.

The starting memory address of the data to be transferred should reside on a 64-bit boundary and the size of block of data to be transferred should be a multiple of 64 bits. In order to remain in compliance with the VMEbus standard, the block must not cross a 256 byte boundary without performing a new address cycle.

The slave modules connected to the DTB receive the address and the address modifier broadcast by the master across the bus and receive LWORD* low and IACK* high 703. Shortly after broadcasting the address and address-modifier 701, the master drives the AS* signal low 705. The slave modules receive the AS* low signal 707. Each slave individually determines whether it will participate in the data transfer by determining whether the broadcasted address is valid for the slave in question 709. If the address is not valid, the data transfer does not involve that particular slave and it ignores the remainder of the data transfer cycle.

The master drives WRITE* low to indicate that the transfer cycle about to occur is a WRITE operation 711. The slave receives the WRITE* low signal 713 and, knowing that the data transfer operation is a WRITE operation, awaits receipt of a high to low transition on the DS0* signal line 715. The master will wait until both DTACK* and BERR* are high 718, which indicates that the previous slave is no longer driving the DTB.

The master proceeds to place the first segment of the data to be transferred on data lines D00 through D31, 719. After placing data on D00 through D31, the master drives DS0* low 721 and, after a predetermined interval, drives DS0* high 723.

In response to the transition of DS0* from high to low, respectively 721 and 723, the slave latches the data being transmitted by the master over data lines D00 through D31, 725. The master places the next segment of the data to be transferred on data lines D00 through D31, 727, and awaits receipt of a DTACK* signal in the form of a high to low transition signal, 729 in FIG. 7B.

Referring to FIG. 7B, the slave then drives DTACK* low, 731, and, after a predetermined period of time, drives DTACK high, 733. The data latched by the slave, 725, is written to a device, which has been selected to store the data 735. The slave also increments the device address 735. The slave then waits for another transition of DS0* from high to low 737.

To commence the transfer of the next segment of the block of data to be transferred, the master drives DS0* low 739 and, after a predetermined period of time, drives DS0* high 741. In response to the transition of DS0* from high to low, respectively 739 and 741, the slave latches the data being broadcast by the master over data lines D00 through D31, 743. The master places the next segment of the data to be transferred on data lines D00 through D31, 745, and awaits receipt of a DTACK* signal in the form of a high to low transition, 747.

The slave then drives DTACK* low, 749, and, after a predetermined period of time, drives DTACK* high, 751. The data latched by the slave, 743, is written to the device selected to store the data and the device address is incremented 753. The slave waits for another transition of DS0* from high to low 737.

The transfer of data will continue in the above-described manner until all of the data has been transferred from the master to the slave. After all of the data has been transferred, the master will release the address lines, address modifier lines, data lines, IACK* line, LWORD* line and DS0* line, 755. The master will then wait for receipt of a DTACK* high to low transition 757. The slave will-drive-DTACK* low, 759 and, after a predetermined period of time, drive DTACK* high 761. In response to the receipt of the DTACK* high to low transition, the master will drive AS* high 763 and then release the AS* line 765.

Figure 8A:
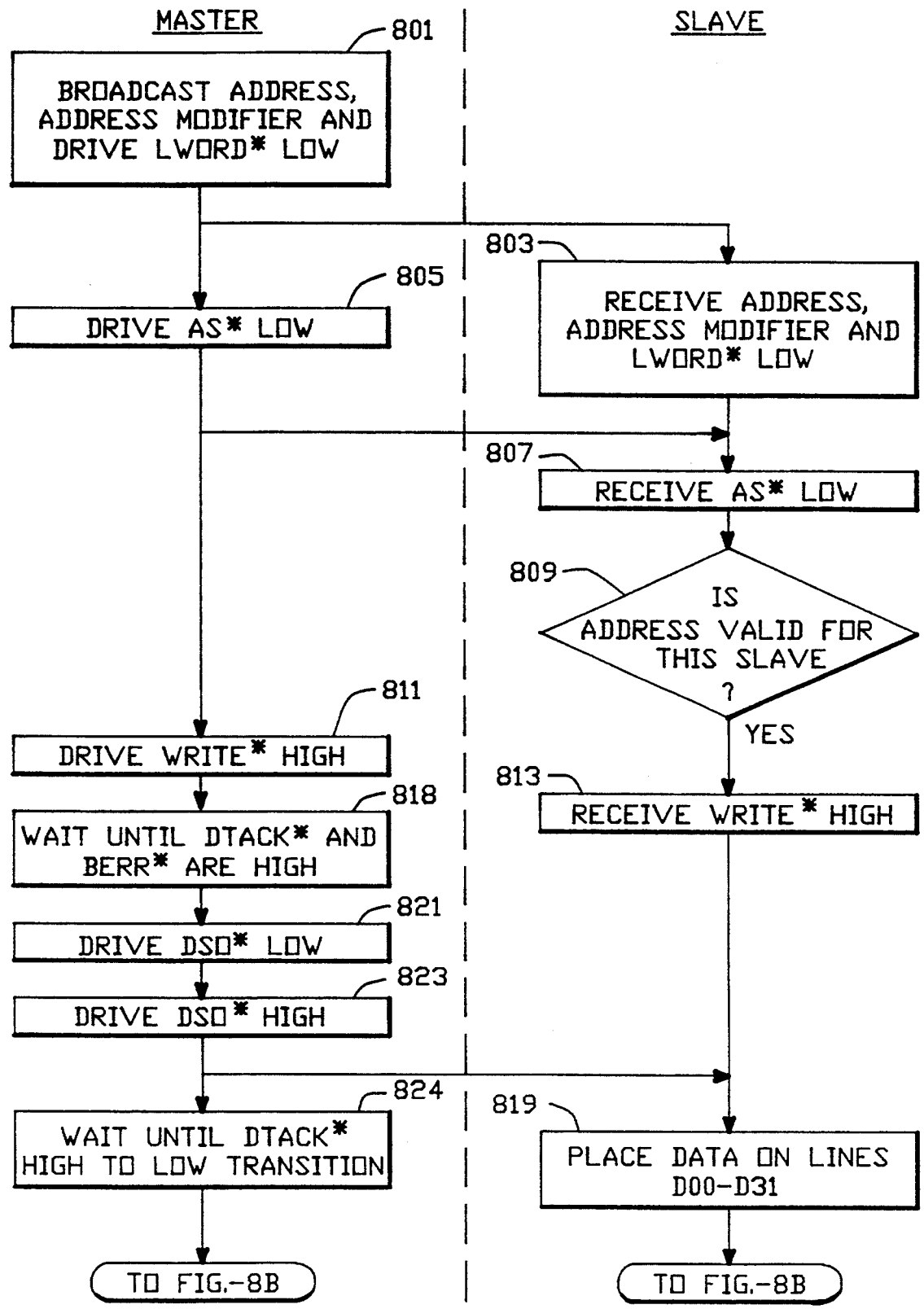
FIGS. 8A-C are a flowchart illustrating the operation of a fast transfer protocol BLOCK READ cycle.

FIG. 8, parts A through C, is a flowchart illustrating the operations involved in accomplishing the fast transfer protocol BLOCK READ cycle. To initiate a BLOCK READ cycle, the master broadcasts the memory address of the data to be transferred and the address modifier across the DTB bus 801. The master drives the LWORD* signal low and the IACK* signal high 801. AS noted previously, a special address modifier indicates to the slave module that the fast transfer protocol will be used to accomplish the BLOCK READ.

The slave modules connected to the DTB receive the address and the address modifier broadcast by the master across the bus and receive LWORD* low and IACK* high 803. Shortly after broadcasting the address and address modifier 801, the master drives the AS* signal low 805. The slave modules receive the AS* low signal 807. Each slave individually determines whether it will participate in the data transfer by determining whether the broadcasted address is valid for the slave in question 809. If the address is not valid, the data transfer does not involve that particular slave and it ignores the remainder of the data transfer cycle.

The master drives WRITE* high to indicate that the transfer cycle about to occur is a READ operation 811. The slave receives the WRITE* high signal 813 and, knowing that the data transfer operation is a READ operation, places the first segment of the data to be transferred-on data lines D00 through D31 819. The master will wait until both DTACK* and BERR* are high 818, which indicates that the previous slave is no longer driving the DTB.

Figure 8B:
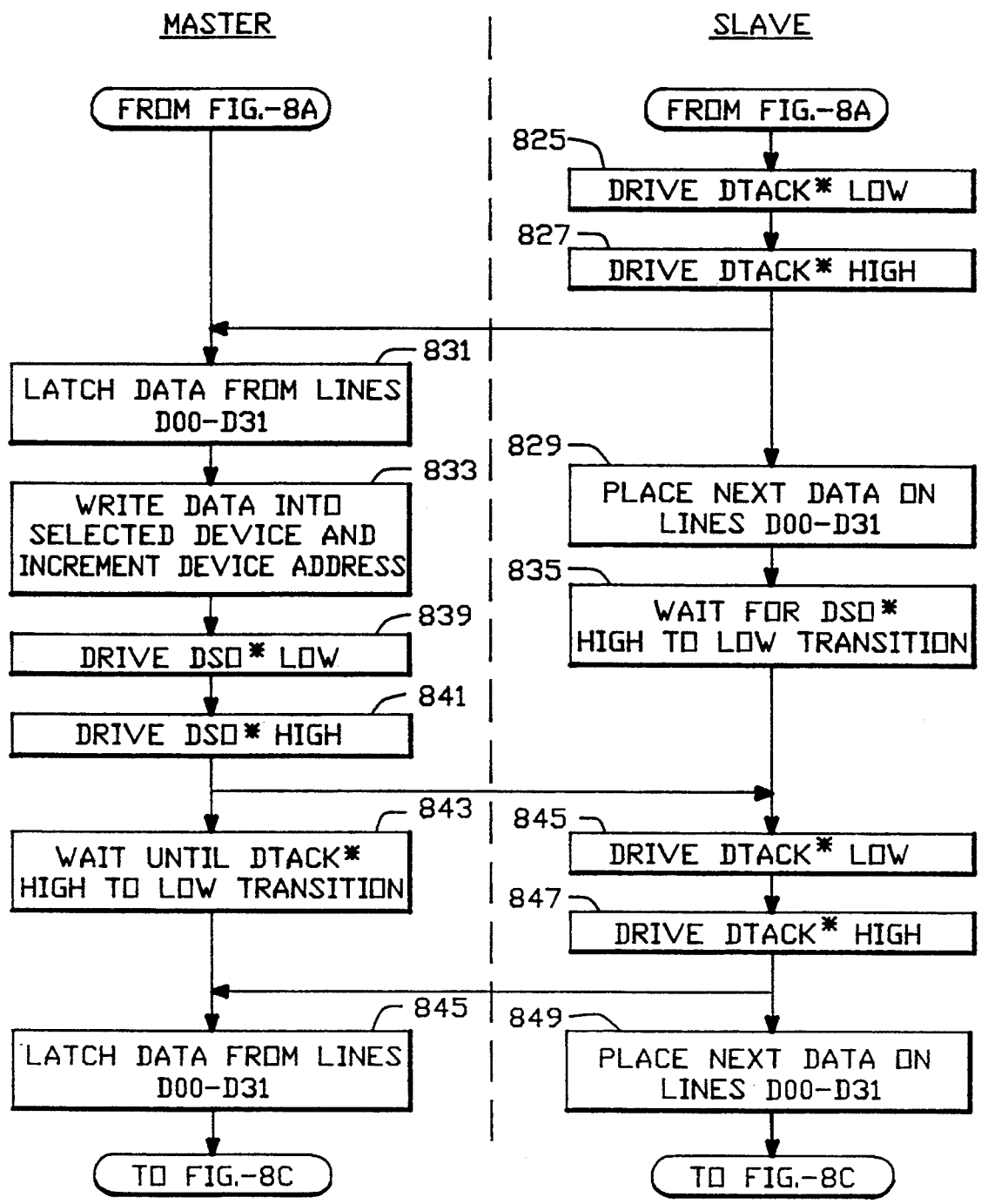
Figure 8C:
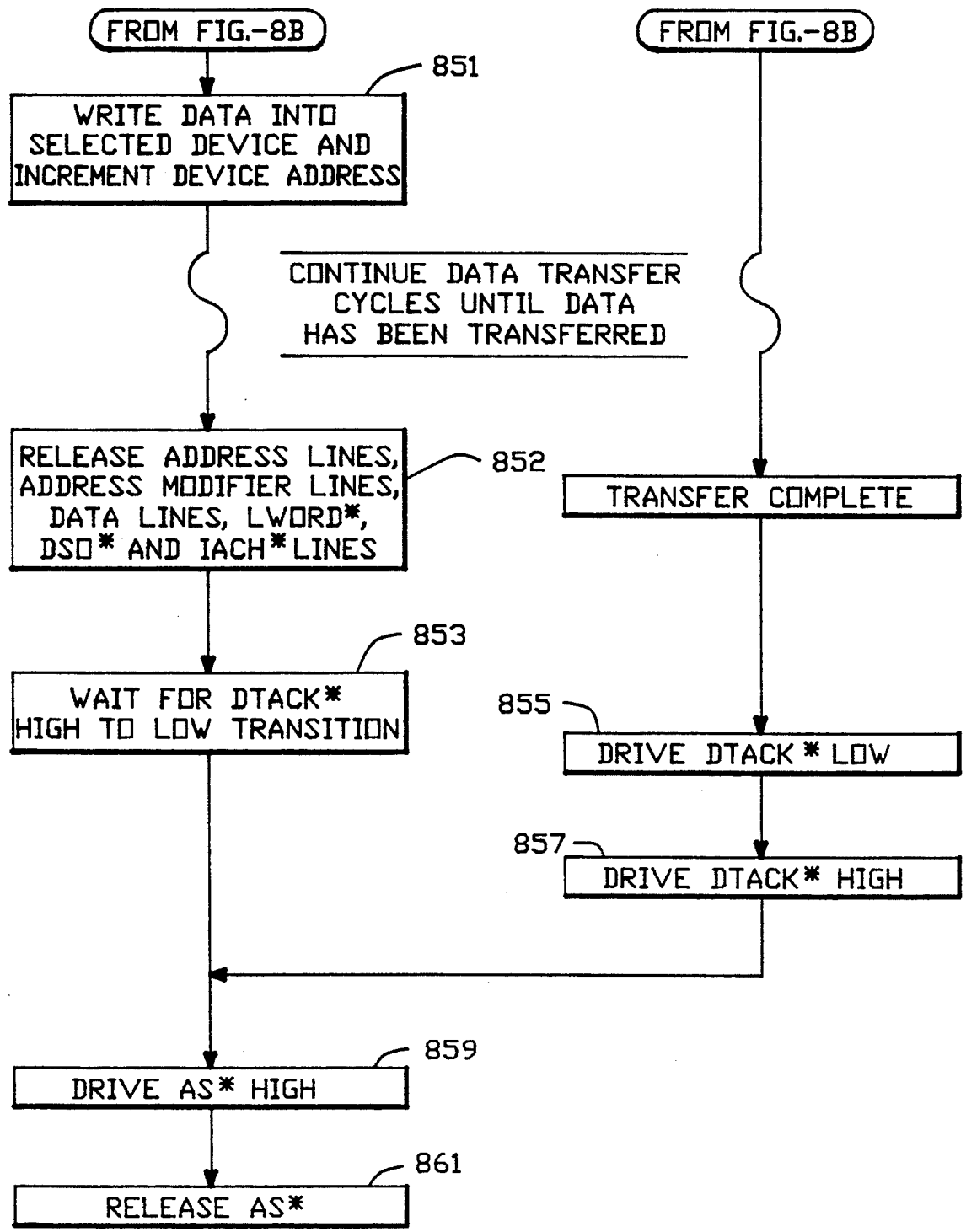

The master then drives DS0* low 821 and, after a predetermined interval, drives DS0* high 823. The master then awaits a high to low transition on the DTACK* signal line 824. As shown in FIG. 8B, the slave then drives the DTACK* signal low 825 and, after a predetermined period of time, drives the DTACK* signal high 827.

In response to the transition of DTACK* from high to low, respectively 825 and 827, the master latches the data being transmitted by the slave over data lines D00 through D31, 831. The data latched by the master, 831, is written to a device, which has been selected to store the data the device address is incremented 833.

The slave places the next segment of the data to be transferred on data lines D00 through D31, 829, and then waits for another transition of DS0* from high to low 837.

To commence the transfer of the next segment of the block of data to be transferred, the master drives DS0* low 839 and, after a predetermined period of time, drives DS0* high 841. The master then waits for the DTACK* line to transition from high to low, 843.

The slave drives DTACK* low, 845, and, after a predetermined period of time, drives DTACK* high, 847. In response to the transition of DTACK* from high to low, respectively 839 and 841, the master latches the data being transmitted by the slave over data lines D00 through D31,845. The data latched by the master, 845, is written to the device selected to store the data, 851 in FIG. 8C, and the device address is incremented. The slave places the next segment of the data to be transferred on data lines D00 through D31, 849.

The transfer of data will continue in the above-described manner until all of the data to be transferred from the slave to the master has been written into the device selected to store the data. After all of the data to be transferred has been written into the storage device, the master will release the address lines, address modifier lines, data lines, the IACK* line, the LWORD line and DS0* line 852. The master will then wait for receipt of a DTACK* high to low transition 853. The slave will drive DTACK* low 855 and, after a predetermined period of time, drive DTACK* high 857. In response to the receipt of the DTACK* high to low transition, the master will drive AS* high 859 and release the AS* line 861.

To implement the fast transfer protocol, a conventional 64 mA tri-state driver is substituted for the 48 mA open collector driver conventionally used in VME slave modules to drive DTACK*. Similarly, the conventional VMEbus data drivers are replaced with 64 mA tri-state drivers in SO-type packages. The latter modification reduces the ground lead inductance of the actual driver package itself and, thus, reduces "ground bounce" effects which contribute to skew between data, DS0* and DTACK*. In addition, signal return inductance along the bus backplane is reduced by using a connector system having a greater number of ground pins so as to minimize signal return and mated-pair pin inductance. One such connector system is the "High Density Plus" connector, Model No. 420-8015-000, manufactured by Teradyne Corporation.

APPENDIX C

Parity FIFO

The parity FIFOs 240, 260 and 270 (on the network controllers 110), and 544 and 554 (on storage processors 114) are each implemented as an ASIC. All the parity FIFOs are identical, and are configured on power-up or during normal operation for the particular function desired. The parity FIFO is designed to allow speed matching between buses of different speed, and to perform the parity generation and correction for the parallel SCSI drives.

The FIFO comprises two bidirectional data ports, Port A and Port B, with 36×64 bits of RAM buffer between them. Port A is 8 bits wide and Port B is 32 bits wide. The RAM buffer is divided into two parts, each 36×32 bits, designated RAM X and RAM Y. The two ports access different halves of the buffer alternating to the other half when available. When the chip is configured as a parallel parity chip (e.g. one of the FIFOs 544 on SP 114a), all accesses on Port B are monitored and parity is accumulated in RAM X and RAM Y alternately.

The chip also has a CPU interface, which may be 8 or 16 bits wide. In 16 bit mode the Port A pins are used as the most significant data bits of the CPU interface and are only actually used when reading or writing to the Fifo Data Register inside the chip.

A REQ, ACK handshake is used for data transfer on both Ports A and B. The chip may be configured as either a master or a slave on Port A in the sense that, in master mode the Port A ACK / RDY output signifies that the chip is ready to transfer data on Port A, and the Port A REQ input specifies that the slave is responding.

In slave mode, however, the Port A REQ input specifies that the master requires a data transfer, and the chip responds with Port A ACK / RDY when data is available. The chip is a master on Port B since it raises Port B REQ and waits for Port BACK to indicate completion of the data transfer.

SIGNAL DESCRIPTIONS

Port A 0-7, P

Port A is the 8 bit data port. Port A P, if used, is the odd parity bit for this port.

A Req, A Ack/Rdy

These two signals are used in the data transfer mode to control the handshake of data on Port A. uP Data 0-7, uP Data P, uPAdd 0-2, CS These signals are used by a microprocessor to address the programmable registers within the chip. The odd parity signal uP Data P is only checked when data is written to the Fifo-Data or Checksum Registers and microprocessor parity is enabled.

Clk

The clock input is used to generate some of the chip timing. It is expected to be in the 10-20 Mhz range.

Read En, Write En

During microprocessor accesses, while CS is true, these signals determine the direction of the microprocessor accesses. During data transfers in the WD mode these signals are data strobes used in conjunction with Port A Ack.

Port B 00-07, 10-17, 20-27, 30-37, 0P-3P

Port B is a 32 bit data port. There is one odd parity bit for each byte. Port B 0P is the parity of bits 00-07, PortB 1P is the parity of bits 10-17, Port B 2P is the parity of bits 20-27, and Port B 3P is the parity of bits 30-37.

B Select, B Req, B Ack, Parity Sync, B Output Enable

These signals are used in the data transfer mode to control the handshake of data on Port B. Port B Req and Port B Ack are both gated with Port B Select. The Port B Ack signal is used to strobe the data on the Port B data lines. The parity sync signal is used to indicate to a chip configured as the parity chip to indicate that the last words of data involved in the parity accumulation are on Port B. The Port B data lines will only be driven by the Fifo chip if all of the following conditions are met:
 a. The data transfer is from Port A to Port B;
 b. The Port B select signal is true;
 c. The Port B output enable signal is true; and
 d. The chip is not configured as the parity chip or it is in parity correct mode and the Parity Sync signal is true.

Reset

This signal resets all the registers within the chip and causes all bidirectional pins to be in a high impedance state.

DESCRIPTION OF OPERATION

Normal Operation. Normally the chip acts as a simple FIFO chip. A FIFO is simulated by using two RAM buffers in a simple ping-pong mode. It is intended, but not mandatory, that data is burst into or out of the FIFO on Port B. This is done by holding Port B Sel signal low and pulsing the Port B Ack signal. When transferring data from Port B to Port A, data is first written into RAM X and when this is full, the data paths will be switched such that Port B may start writing to RAM Y. Meanwhile the chip will begin emptying RAM X to Port A. When RAM Y is full and RAM X empty the data paths will be switched again such that Port B may reload RAM X and Port A may empty RAM Y.

Port A Slave Mode. This is the default mode and the chip is reset to this condition. In this mode the chip waits for a master such as one of the SCSI adapter chips 542 to raise Port A Request for data transfer. If data is available the Fifo chip will respond with Port A Ack/Rdy.

Port A WD Mode. The chip may be configured to run in the WD or Western Digital mode. In this mode the chip must be configured as a slave on Port A. It differs from the default slave mode in that the chip responds with Read Enable or Write Enable as appropriate together with Port A Ack/Rdy. This mode is intended to allow the chip to be interfaced to the Western Digital 33C93A SCSI chip or the NCR 53C90 SCSI chip.

Port A Master Mode. When the chip is configured as a master, it will raise Port A Ack/Rdy when it is ready for data transfer. This signal is expected to be tied to the Request input of a DMA controller which will respond with Port A Req when data is available. In order to allow the DMA controller to burst, the Port A Ack/Rdy signal will only be negated after every 8 or 16 bytes transferred.

Port B Parallel Write Mode. In parallel write mode, the chip is configured to be the parity chip for a parallel transfer from Port B to Port A. In this mode, when Port B Select and Port B Request are asserted, data is written into RAM X or RAM Y each time the Port B Ack signal is received. For the first block of 128 bytes data is simply copied into the selected RAM. The next 128 bytes driven on Port B will be exclusive-ORed with the first 128 bytes. This procedure will be repeated for all drives such that the parity is accumulated in this chip. The Parity Sync signal should be asserted to the parallel chip together with the last block of 128 bytes. This enables the chip to switch access to the other RAM and start accumulating a new 128 bytes of parity.

Port B Parallel Read Mode—Check Data. This mode is set if all drives are being read and parity is to be checked. In this case the Parity Correct bit in the Data Transfer Configuration Register is not set. The parity chip will first read 128 bytes on Port A as in a, normal read mode and then raise Port B Request. While it has this signal asserted the chip will monitor the Port B Ack signals and exclusive-or the data on Port B with the data in its selected RAM. The Parity Sync should again be asserted with the last block of 128 bytes. In this mode the chip will not drive the Port B data lines but will check the output of its exclusive-or logic for zero. If any bits are set at this time a parallel parity error will be flagged.

Port B Parallel Read Mode—Correct Data. This mode is set by setting the Parity Correct bit in the Data Transfer Configuration Register. In this case the chip will work exactly as in the check mode except that when Port B Output Enable, Port B Select and Parity Sync are true the data is driven onto the Port B data lines and a parallel parity check for zero is not performed.

Byte Swap. In the normal mode it is expected that Port B bits 00–07 are the first byte, bits 10–17 the second byte, bits 20–27 the third byte, and bits 30–37 the last byte of each word. The order of these bytes may be changed by writing to the byte swap bits in the configuration register such that the byte address bits are inverted. The way the bytes are written and read also depend on whether the CPU interface is configured as 16 or 8 bits. The following table shows the byte alignments for the different possibilities for data transfer using the Port A Request / Acknowledge handshake:

| CPU I/F | Invert Addr 1 | Invert Addr 0 | Port B 00–07 | Port B 10–17 | Port B 20–27 | Port B 30–37 |
| --- | --- | --- | --- | --- | --- | --- |
| 8 | False | False | Port A byte 0 | Port A byte 1 | Port A byte 2 | Port A byte 1 |
| 8 | False | True | Port A byte 1 | Port A byte 0 | Port A byte 3 | Port A byte 2 |
| 8 | True | False | Port A byte 2 | Port A byte 3 | Port A byte 0 | Port A byte 1 |
| 8 | True | True | Port A byte 3 | Port A byte 2 | Port A byte 1 | Port A byte 0 |
| 16 | False | False | Port A byte 0 | uProc byte 0 | Port A byte 1 | uProc byte 1 |
| 16 | False | True | uProc byte 0 | Port A byte 0 | uProc byte 1 | Port A byte 1 |
| 16 | True | False | Port A byte 1 | uProc byte 1 | Port A byte 0 | uProc byte 0 |
| 16 | True | True | uProc byte 1 | Port A byte 1 | uProc byte 0 | Port A byte 0 |

When the Fifo is accessed by reading or writing the Fifo Data Register through the microprocessor port in 8 bit mode, the bytes are in the same order as the table above but the uProc data port is used instead of Port A. In 16 bit mode the table above applies.

Odd Length Transfers. If the data transfer is not a multiple of 32 words, or 128 bytes, the microprocessor must manipulate the internal registers of the chip to ensure all data is transferred. Port A Ack and Port B Req are normally not asserted until all 32 words of the selected RAM are available. These signals may be forced by writing to the appropriate RAM status bits of the Data Transfer Status Register.

When an odd length transfer has taken place the microprocessor must wait until both ports are quiescent before manipulating any registers. It should then reset both of the Enable Data Transfer bits for Port A and Port B in the Data Transfer Control Register. It must then determine by reading their Address Registers and the RAM Access Control Register whether RAM X or RAM Y holds the odd length data. It should then set the corresponding Address Register to a value of 20 hexadecimal, forcing the RAM full bit and setting the address to the first word. Finally the microprocessor should set the Enable Data Transfer bits to allow the chip to complete the transfer.

At this point the Fifo chip will think that there are now a full 128 bytes of data in the RAM and will transfer 128 bytes if allowed to do so, The fact that some of these 128 bytes are not valid must be recognized externally to the FIFO chip.

PROGRAMMABLE REGISTERS

Data Transfer Configuration Register (Read/Write)

Register Address 0. This register is cleared by the reset signal.

| | |
|---|---|
| Bit 0 | WD Mode. Set if data transfers are to use the Western Digital WD33C93A protocol, otherwise the Adaptec 6250 protocol will be used. |
| Bit 1 | Parity Chip. Set if this chip is to accumulate Port B parities. |
| Bit 2 | Parity Correct Mode. Set if the parity chip is to correct parallel parity on Port B. |
| Bit 3 | CPU Interface 16 bits wide. If set, the microprocessor data bits are combined with the Port A data bits to effectively produce a 16 bit Port. All accesses by the microprocessor as well as all data transferred using the Port A Request and Acknowledge handshake will transfer 16 bits. |
| Bit 4 | Invert Port A byte address 0. Set to invert the least significant bit of Port A byte address. |
| Bit 5 | Invert Port A byte address 1. Set to invert the most significant bit of Port A byte address. |
| Bit 6 | Checksum Carry Wrap. Set to enable the carry out of the 16 bit checksum adder to carry back into the least significant bit of the adder. |
| Bit 7 | Reset. Writing a 1 to this bit will reset the other registers. This bit resets itself after a maximum of 2 clock cycles and will therefore normally be read as a 0. No other register should be written for a minimum of 4 clock cycles after writing to this bit. |

Data Transfer Control Register (Read/Write)

Register Address 1. This register is cleared by the reset signal or by writing to the reset bit.

| | |
|---|---|
| Bit 0 | Enable Data Transfer on Port A. Set to enable the Port A Req/Ack handshake. |
| Bit 1 | Enable Data Transfer on Port B. Set to enable the Port B Req/Ack handshake. |
| Bit 2 | Port A to Port B. If set, data transfer is from Port A to Port B. If reset, data transfer is from Port B to Port A. In order to avoid any glitches on the request lines, the state of this bit should not be altered at the same time as the enable data transfer bits 0 or 1 above. |
| Bit 3 | uProcessor Parity Enable. Set if parity is to be checked on the microprocessor interface. It will only be checked when writing to the Fifo Data Register or reading from the Fifo Data or Checksum Registers, or during a Port A Request/Acknowledge transfer in 16 bit mode. The chip will, however, always re-generate parity ensuring that correct parity is written to the RAM or read on the microprocessor interface. |
| Bit 4 | Port Parity Enable. Set if parity is to be checked on Port A. It is checked when accessing the Fifo Data Register in 16 bit mode, or during a Port A Request/Acknowledge transfer. The chip will, however, always re-generate parity ensuring that correct parity is written to the RAM or read on the Port A interface |
| Bit 5 | Port B Parity Enable. Set if Port B data has valid byte parities. If it is not set, byte parity is generated internally to the chip when writing to the RAMs. Byte parity is not checked when writing from Port B, but always checked when reading to Port B. |
| Bit 6 | Checksum Enable. Set to enable writing to the 16 bit checksum register. This register accumulates a 16 bit checksum for all RAM accesses, including accesses to the Fifo Data Register, as well as all writes to the checksum register. This bit must be reset before reading from the Checksum Register. |
| Bit 7 | Port A Master. Set if Port A is to operate in the master mode on Port A during the data transfer. |

Data Transfer Status Register (Read Only)

Register Address 2. This register is cleared by the reset signal or by writing to the reset bit.

| | |
|---|---|
| Bit 0 | Data in RAM X or RAM Y. Set if any bits are true in the RAM X, RAM Y, or Port A byte address registers. |
| Bit 1 | uProc Port Parity Error. Set if the uProc Parity Enable bit is set and a parity error is detected on the microprocessor interface during any RAM access or write to the Checksum Register in 16 bit mode. |
| Bit 2 | Port A Parity Error. Set if the Port A Parity Enable bit is set and a parity error is detected on the Port A interface during any RAM access or write to the Checksum Register. |
| Bit 3 | Port B Parallel Parity Error. Set if the chip is configured as the parity chip, is not in parity correct mode, and a non zero result is detected when the Parity Sync signal is true. It is also set whenever data is read out onto Port B and the data being read back through the bidirectional buffer does not compare. |
| Bits 4–7 | Port B Bytes 0–3 Parity Error. Set whenever the data being read out of the RAMs on the Port B side has bad parity. |

Ram Access Control Register (Read/Write)

Register Address 3. This register is cleared by the reset signal or by writing to the reset bit. The Enable Data Transfer bits in the Data Transfer Control Register must be reset before attempting to write to this register, else the write will be ignored.

| | |
|---|---|
| Bit 0 | Port A byte address 0. This bit is the least significant byte address bit. It is read directly bypassing any inversion done by the invert bit in the Data Transfer Configuration Register. |
| Bit 1 | Port A byte address 1. This bit is the most significant byte address bit. It is read directly bypassing any inversion done by the invert bit in the Data Transfer Configuration Register. |
| Bit 2 | Port A to RAM Y. Set if Port A is accessing RAM Y, and reset if it is accessing RAM X. |
| Bit 3 | Port B to RAM Y. Set if Port B is accessing RAM Y, and reset if it is accessing RAM X. |
| Bit 4 | Long Burst. If the chip is configured to transfer data on Port A as a master, and this bit is reset, the chip will only negate Port A Ack/Rdy after every 8 bytes, or 4 words in 16 bit mode, have been transferred. If this bit is set, Port A Ack/Rdy will be negated every 16 |

RAM X Address Register (Read/Write)

Register Address 4. This register is cleared by the reset signal or by writing to the reset bit. The Enable Data Transfer bits in the Data Transfer Control Register must be reset before attempting to write to this register, else the write will be ignored.

| Bits 0-4 | RAM X word address |
|---|---|
| Bit 5 | RAM X full |
| Bits 6-7 | Not Used |

RAM Y Address Register (Read/Write)

Register Address 5. This register is cleared by the reset signal or by writing to the reset bit. The Enable Data Transfer bits in the Data Transfer Control Register must be reset before attempting to write to this register, else the write will be ignored.

| Bits 0-4 | RAM Y word address |
|---|---|
| Bit 5 | RAM Y full |
| Bits 6-7 | Not Used |

Fifo Data Register (Read/Write)

Register Address 6. The Enable Data Transfer bits in the Data Transfer Control Register must be reset before attempting to write to this register, else the write will be ignored. The Port A to Port B bit in the Data Transfer Control register must also be set before writing this register. If it is not, the RAM controls will be incremented but no data will be written to the RAM. For consistency, the Port A to PortB should be reset prior to reading this register.

Bits 0-7 are Fifo Data. The microprocessor may access the FIFO by reading or writing this register. The RAM control registers are updated as if the access was using Port A. If the chip is configured with a 16 bit CPU Interface the most significant byte will use the Port A 0-7 data lines, and each Port A access will increment the Port A byte address by 2.

Port A Checksum Register (Read/Write)

Register Address 7. This register is cleared by the reset signal or by writing to the reset bit.

Bits 0-7 are Checksum Data. The chip will accumulate a 16 bit checksum for all Port A accesses. If the chip is configured with a 16 bit CPU interface, the most significant byte is read on the Port A 0-7 data lines. If data is written directly to this register it is added to the current contents rather than overwriting them. It is important to note that the Checksum Enable bit in the Data Transfer Control Register must be set to write this register and reset to read it.

PROGRAMMING THE FIFO CHIP

In general the fifo chip is programmed by writing to the data transfer configuration and control registers to enable a data transfer, and by reading the data transfer status register at the end of the transfer to check the completion status. Usually the data transfer itself will take place with both the Port A and the Port B handshakes enabled, and in this case the data transfer itself should be done without any other microprocessor interaction. In some applications, however, the Port A handshake may not be enabled, and it will be necessary for the microprocessor to fill or empty the fifo by repeatedly writing or reading the Fifo Data Register.

Since the fifo chip has no knowledge of any byte counts, there is no way of telling when any data transfer is complete by reading any register within this chip itself. Determination of whether the data transfer has been completed must therefore be done by some other circuitry outside this chip.

The following C language routines illustrate how the parity FIFO chip may be programmed. The routines assume that both Port A and the microprocessor port are connected to the system microprocessor, and return a size code of 16 bits, but that the hardware addresses the Fifo chip as long 32 bit registers.

```
struct FIFO_regs {
  unsigned char config,a1,a2,a3 ;
  unsigned char control,b1,b2,b3;
  unsigned char status,c1,c2,c3;
  unsigned char ram_access_control,d1,d2,d3;
  unsigned char ram_X_addr,e1,e2,e3;
  unsigned char ram_Y_addr,f1,f2,f3;
  unsigned long data;
  unsigned int checksum,h1;
};

#define FIFO1 ((struct  FIFO_regs*) FIFO_BASE_ADDRESS)

#define FIFO_RESET 0x80
#define FIFO_16_BITS 0x08
#define FIFO_CARRY_WRAP 0x40
#define FIFO_PORT_A_ENABLE 0x01
#define FIFO_PORT_B_ENABLE 0x02
```

```
#define FIFO_PORT_ENABLES 0x03
#define FIFO_PORT_A_TO_B 0x04
#define FIFO_CHECKSUM_ENABLE 0x40
#define FIFO_DATA_IN_RAM 0x01
define FIFO_FORCE_RAM_FULL 0x20 define PORT_A_TO_PORT_B(fifo) ((fifo-> control ) & 0x04)
define PORT_A_BYTE_ADDRESS(fifo) ((fifo->ram_access_control) &
    0x03)
#define PORT_A_TO_RAM_Y(fifo)   ((fifo->ram_access_control ) &
    0x04)
#define PORT_B_TO_RAM_Y(fifo)   ((fifo-> ram_access_control ) &
    0x08)
```

/*********************************************************
        The following routine initiates a Fifo data transfer using
two values passed to it.

config_data     This is the data to be written to the
                  configuration register.

control_data    This is the data to be written to the Data
                  Transfer Control Register. If the data transfer
                  is to take place automatically using both the
                  Port A and Port B handshakes, both data transfer
                  enables bits should be set in this parameter.
*********************************************************/

```
FIFO_initiate_data_transfer(config_data, control_data)
unsigned char config_data, control_data;
{
  FIFO1->config = config_data | FIFO_RESET;     /* Set
        Configuration value & Reset */

FIFO1->control = control_data & (~FIFO_PORT_ENABLES);   /* Set
        everything but enables */
  FIFO1->control = control_data ;                  /* Set data transfer
enables */
}
```

/*********************************************************
        The following routine forces the transfer of any odd bytes
that have been left in the Fifo at the end of a data transfer.
It first disables both ports, then forces the Ram Full bits, and
then re-enables the appropriate Port.
*********************************************************/

```
FIFO_force_odd_length_transfer()
{
  FIFO1->control &= ~FIFO_PORT_ENABLES; /* Disable Ports A & B */
  if (PORT_A_TO_PORT_B(FIFO1))  {
        if (PORT_A_TO_RAM_Y(FIFO1)) {
              FIFO1->ram_Y_addr = FIFO_FORCE_RAM_FULL; /* Set RAM Y
full */
        }
        else FIFO1->ram_X_addr = FIFO_FORCE_RAM_FULL ;   /* Set RAM
X full */
```

```
         FIFO1->control |= FIFO_PORT_B_ENABLE ;      /* Re-Enable
Port B */
   }
   else {
         if (PORT_B_TO_RAM_Y(FIFO1))  {
              FIFO1->ram_Y_addr = FIFO_FORCE_RAM_FULL ;      /* Set
RAM Y full */
         }
         else FIFO1->ram_X_addr = FIFO_FORCE_RAM_FULL ;   /* Set RAM
X full */
         FIFO1->control |= FIFO_PORT_A_ENABLE ;      /* Re-Enable
Port A */
   }
}

/***********************************************************
     The following routine returns how many odd bytes have been
left in the Fifo at the end of a data transfer.
************************************************************/ int FIFO_count_odd_bytes()
{
  int number_odd_bytes;
  number_odd_bytes=0;
  if (FIFO1->status & FIFO_DATA_IN_RAM)   {
       if (PORT_A_TO_PORT_B(FIFO1))  {
              number_odd_bytes = (PORT_A_BYTE_ADDRESS(FIFO1)) ;
              if (PORT_A_TO_RAM_Y(FIFO1))
                   number_odd_bytes += (FIFO1->ram_Y_addr) * 4 ;
              else number_odd_bytes += (FIFO1->ram_X_addr) * 4 ;
       }
       else {
              if (PORT_B_TO_RAM_Y(FIFO1))
                   number_odd_bytes = (FIFO1->ram_Y_addr) * 4 ;
              else number_odd_bytes = (FIFO1->ram_X_addr) * 4 ;
       }
  }
  return (number_odd_bytes);
}

/***********************************************************
     The following routine tests the microprocessor interface of
the chip.  It first writes and reads the first 6 registers.  It
then writes 1s, 0s, and an address pattern to the RAM, reading the
data back and checking it.

The test returns a bit significant error code where each
bit represents the address of the registers that failed.

Bit 0 = config register failed
  Bit 1 = control register failed
  Bit 2 = status register failed
  Bit 3 = ram access control register failed
  Bit 4 = ram X address register failed
  Bit 5 = ram Y address register failed
  Bit 6 = data register failed
```

```
    Bit 7 = checksum register failed
***************************************************/ define RAM_DEPTH 64          /* number of long words in Fifo Ram */ reg_expected_data[6] = { 0x7F, 0xFF, 0x00, 0x1F, 0x3F, 0x3F };

char  FIFO_uprocessor_interface_test()
{
  unsigned long test_data;
  char *register_addr;
  int i;
  char j,error;
  FIFO1->config = FIFO_RESET;        /* reset the chip */
  error=0;
  register_addr =(char *) FIFO1;
  j=1;

/* first test registers 0 thru 5 */ for (i=0; i<6; i++) {
      *register_addr = 0xFF;         /* write test data */
      if (*register_addr != reg_expected_data[i]) error |= j;
      *register_addr = 0;            /* write 0s to register */
      if (*register_addr) error |= j;
      *register_addr = 0xFF;         /* write test data again */
      if (*register_addr != reg_expected_data[i]) error |= j;
      FIFO1->config = FIFO_RESET;    /* reset the chip */
      if (*register_addr) error |= j; /* register should be 0 */
      register_addr++;               /* go to next register */
      j <<=1;
  }

/* now test Ram data & checksum registers
           test 1s throughout Ram & then test 0s */ for (test_data = -1; test_data != 1; test_data++)   {   /* test
for 1s & 0s */
        FIFO1->config = FIFO_RESET | FIFO_16_BITS ;
        FIFO1->control = FIFO_PORT_A_TO_B;
        for (i=0;i<RAM_DEPTH;i++)           /* write data to RAM */
            FIFO1->data = test_data;
        FIFO1->control = 0;
        for (i=0;i<RAM_DEPTH;i++)
            if (FIFO1->data != test_data) error |= j;     /* read
& check data */
        if (FIFO1->checksum) error |= 0x80;         /* checksum
should = 0 */
   }

/* now test Ram data with address pattern
           uses a different pattern for every byte */ test_data=0x00010203;             /* address pattern start */
   FIFO1->config = FIFO_RESET | FIFO_16_BITS | FIFO_CARRY_WRAP;
   FIFO1->control = FIFO_PORT_A_TO_B | FIFO_CHECKSUM_ENABLE;
```

```
for (i=0;i<RAM_DEPTH;i++) {
      FIFO1->data = test_data;          /* write address pattern */
      test_data += 0x04040404;
}
test_data=0x00010203;                   /* address pattern start */
FIFO1->control = FIFO_CHECKSUM_ENABLE;
for (i=0;i<RAM_DEPTH;i++) {
      if (FIFO1->status != FIFO_DATA_IN_RAM)
            error |= 0x04;              /* should be data in ram */
      if (FIFO1->data != test_data) error |= j;   /* read &
check address pattern */
      test_data += 0x04040404;
}
if (FIFO1->checksum != 0x0102) error |= 0x80;    /* test
checksum of address pattern */
FIFO1->config = FIFO_RESET | FIFO_16_BITS ;  /* inhibit carry
wrap */
FIFO1->checksum = 0xFEFE;               /* writing adds to checksum */
if (FIFO1->checksum) error |=0x80;      /* checksum should be 0 */
if (FIFO1->status) error |= 0x04;       /* status should be 0 */
return (error);
}
```

What is claimed is:

1. Network server apparatus for use with a data network and a mass storage device, comprising:
   an interface processor unit coupleable to said network and to said mass storage device;
   a host processor unit coupleable to said interface processor unit by a second path different from said network;
   means in said interface processor unit for satisfying requests from said network to store data from said network on said mass storage device;
   means in said interface processor unit for satisfying requests from said network to retrieve data from said mass storage device to said network;
   means in said interface processor unit for satisfying requests received from said host processor unit over said second path to store data from said host processor unit on said mass storage device; and
   means in said interface processor unit for satisfying requests received from said host processor unit over said second path to retrieve data from said mass storage device to said host processor unit.

2. Apparatus according to claim 1, wherein said interface processor unit comprises:
   a network control unit coupleable to said network;
   a data control unit coupleable to said mass storage device;
   a buffer memory;
   means in said network control unit for transmitting to said data control unit requests from said network to store specified storage data from said network on said mass storage device;
   means in said network control unit for transmitting said specified storage data from said network to said buffer memory and from said buffer memory to said data control unit;
   means in said network control unit for transmitting to said data control unit requests from said network to retrieve specified retrieval data from said mass storage device to said network; and
   means in said network control unit for transmitting said specified retrieval data from said data control unit to said buffer memory and from said buffer memory to said network.

3. Apparatus according to claim 2, wherein said data control unit comprises:
   a storage processor unit coupleable to said mass storage device;
   a file processor unit;
   means on said file processor unit for translating said file system level storage requests from said network into requests to store data at specified physical storage locations in said mass storage device;
   means on said file processor unit for instructing said storage processor unit to write data from said buffer memory into said specified physical storage locations in said mass storage device;
   means on said file processor unit for translating file system level retrieval requests from said network into requests to retrieve data from specified physical retrieval locations in said mass storage device;
   means on said file processor unit for instructing said storage processor unit to retrieve data from said specified physical retrieval locations in said mass storage device to said buffer memory if said data from said specified physical locations is not already in said buffer memory; and
   means in said storage processor unit for transmitting data between said buffer memory and said mass storage device.

4. Apparatus according to claim 1, for use further with a buffer memory, and wherein said requests from said network to store and retrieve data include file system level storage and retrieval requests respectively, and wherein said interface processor unit comprises:
   a storage processor unit coupleable to said mass storage device;

a file processor unit;

means on said file processor unit for translating said file system level storage requests into requests to store data at specified physical storage locations in said mass storage device;

means on said file processor unit for instructing said storage processor unit to write data from said buffer memory into said specified physical storage locations in said mass storage device;

means on said file processor unit for translating said file system level retrieval requests into requests to retrieve data from specified physical retrieval locations in said mass storage device;

means on said file processor unit for instructing said storage processor unit to retrieve data from said specified physical retrieval locations in said mass storage device to said buffer memory if said data from said specified physical locations is not already in said buffer memory; and means in said storage processor unit for transmitting data between said buffer memory and said mass storage device.

5. A network node for use with a data network and a mass storage device, comprising:

a system buffer memory;

a network control unit coupleable to said network and having direct memory access to said system buffer memory;

a data control unit coupleable to said mass storage device and having direct memory access to said system buffer memory;

first means for satisfying requests from said network to store data from said network on said mass storage device; and second means for satisfying requests from said network to retrieve data from said mass storage device to said network, said first and second means collectively including means for transmitting from said network control unit to said system memory bank by direct memory access file data from said network for storage on said mass storage device, means for transmitting from said system memory bank to said data control unit by direct memory access said file data from said network for storage on said mass storage device, means for transmitting from said data control unit to said system memory bank by direct memory access file data for retrieval from said mass storage device to said network, and means for transmitting from said system memory bank to said network control unit said file data for retrieval from said mass storage device to said network;

at least said network control unit including a microprocessor and local instruction storage means distinct from said system buffer memory, all instructions for said microprocessor residing in said local instruction storage means.

6. A network file server for use with a data network and a mass storage device, comprising:

a host processor unit; and an interface processor unit coupleable to said network, to said mass storage device and, over a second path different from said network, to said host processor unit, said interface processor unit including means for decoding all NFS requests from said network, means for performing all procedures for satisfying said NFS requests, means for encoding any NFS reply messages for return transmission on said network, and means for satisfying file system requests from said host processor unit over sand second path.

7. Network server apparatus for use with a data network, comprising:

a network controller coupleable to said network to receive incoming information packets over said network, said incoming information packets including certain packets which contain part or all of a request to said server apparatus, said request being in either a first or a second class of requests to said server apparatus;

a first additional processor;

an interchange bus different from said network and coupled between said network controller and said first additional processor;

means in said network controller for detecting and satisfying requests in said first class of requests contained in said certain incoming information packets, said network controller lacking means in said network controller for satisfying requests in said second class of requests; and means in said network controller for satisfying requests received over said interchange bus from said first additional processor.

8. Apparatus according to claim 7, wherein said means in said network controller for detecting and satisfying requests in said first class of requests, assembles said requests in said first class of requests into assembled requests before satisfying said requests in said first class of requests.

9. Apparatus according to claim 7, wherein said packets each include a network node destination address, wherein said means in said network controller for detecting and satisfying requests in said first class of requests, assembles said requests in said first class of requests, in a format which omits said network node destination addresses, before satisfying said requests in said first class of requests.

10. Apparatus according to claim 7, wherein said means in said network controller for detecting and satisfying requests in said first class includes means for preparing an outgoing message in response to one of said first class of requests, means for packaging said outgoing message in outgoing information packets suitable for transmission over said network, and means for transmitting said outgoing information packets over said network.

11. Apparatus according to claim 7, wherein said first class of requests comprises requests for an address of said server apparatus, and wherein said means in said network controller for detecting and satisfying requests in said first class comprises means for preparing a response packet to such an address request and means for transmitting said response packet over said network.

12. Apparatus according to claim 7, for use further with a second data network, said network controller being coupleable further to said second network, wherein said first class of requests comprises requests to route a message to a destination reachable over said second network, and wherein said means in said network controller for detecting and satisfying requests in said first class comprises means for detecting that one of said certain packets comprises a request to route a message contained in said one of said certain packets to a destination reachable over said second network, and means for transmitting said message over said second network.

13. Apparatus according to claim 12, for use further with a third data network, said network controller further comprising means in said network controller for detecting particular requests in said incoming information packets to route a message contained in said particular requests, to a destination reachable over said third network, said apparatus further comprising:
a second network controller coupled to said interchange bus and coupleable to said third data network;
means for delivering said message contained in said particular requests to said second network controller over said interchange bus; and
means in said second network controller for transmitting said message contained in said particular requests over said third network.

14. Apparatus according to claim 7, for use further with a third data network, said network controller further comprising means in said network controller for detecting particular requests in said incoming information packets to route a message contained in said particular requests, to a destination reachable over said third network, said apparatus further comprising:
a second network controller coupled to said interchange bus and coupleable to said third data network;
means for delivering said message contained in said particular requests to said second network controller over said interchange bus; and
means in said second network controller;for transmitting said message contained in said particular requests over said third network.

15. Apparatus according to claim 7, for use further with amass storage device, wherein said first additional processor comprises a data control unit coupleable to said mass storage device, wherein said second class of requests comprises remote calls to procedures for managing a file system in said mass storage device, and wherein said means in said first additional processor for further processing said assembled requests in said second class of requests comprises means for executing file system procedures on said mass storage device in response to said assembled requests.

16. Apparatus according to claim 15, wherein said file system procedures include a read procedure for reading data from said mass storage device,
said means in said first additional processor for further processing said assembled requests including means for reading data from a specified location in said mass storage device in response to a remote call to said read procedure,
said apparatus further including means for delivering said data to said network controller,
said network controller further comprising means on said network controller for packaging said data in outgoing information packets suitable for transmission over said network, and means for transmitting said outgoing information packets over said network.

17. Apparatus according to claim 16, wherein said means for delivering comprises:
a system buffer memory coupled to said interchange bus;

means in said data control unit for transferring said data over said interchange bus into said buffer memory; and
means in said network controller for transferring said data over said interchange bus from said system buffer memory to said network controller.

18. Apparatus according to claim 15, wherein said file system procedures include a read procedure for reading a specified number of bytes of data from said mass storage device beginning at an address specified in logical terms including a file system ID and a file ID, said means for executing file system procedures comprising:
means for converting the logical address specified in a remote call to said read procedure to a physical address; and
means for reading data from said physical address in said mass storage device.

19. Apparatus according to claim 18, wherein said mass storage device comprises a disk drive having a numbered tracks and sectors, wherein said logical address specifies said file system ID, said file ID, and a byte offset, and wherein said physical address specifies a corresponding track and sector number.

20. Apparatus according to claim 15, wherein said file system procedures include a read procedure for reading a specified number of bytes of data from said mass storage device beginning at an address specified in logical terms including a file system ID and a file ID,
said data control unit comprising a file processor coupled to said interchange bus and a storage processor coupled to said interchange bus and coupleable to said mass storage device,
said file processor comprising means for converting the logical address specified in a remote call to said read procedure to a physical address,
said apparatus further comprising means for delivering said physical address to said storage processor,
said storage processor comprising means for reading data from said physical address in said mass storage device and for transferring said data over said interchange bus into said buffer memory; and
means in said network controller for transferring said data over said interchange bus from said system buffer memory to said network controller.

21. Apparatus according to claim 15, wherein said file system procedures include a write procedure for writing data contained in an assembled request, to said mass storage device,
said means in said first additional processor for further processing said assembled requests including means for writing said data to a specified location in said mass storage device in response to a remote call to said read procedure.

22. Apparatus according to claim 7, wherein said network controller comprises:
a microprocessor;
a local instruction memory containing local instruction code;
a local bus coupled between said microprocessor and said local instruction memory;
bus interface means for interfacing said microprocessor with said interchange bus at times determined by said microprocessor in response to said local instruction code; and
network interface means for interfacing said microprocessor with said data network,
said local instruction memory including all instruction code necessary for said microprocessor to perform said function of detecting and satisfying requests in said first class of requests.

23. Network server apparatus for use with a data network, comprising:
   a network controller coupleable to said network to receive incoming information packets over said network, said incoming information packets including certain packets which contain part or all of a message to said server apparatus, said message being in either a first or a second class of messages to said server apparatus, said messages in said first class of messages including certain messages containing requests;
   a host computer;
   an interchange bus different from said network and coupled between said network controller and said host computer;
   means in said network controller for detecting and satisfying said requests in said first class of messages; and
   means for satisfying requests received over said interchange bus from said host computer.

24. Apparatus according to claim 23, wherein said means in said network controller for detecting and satisfying requests in said first class includes means for preparing an outgoing message in response to one of said requests in said first class of messages, means for packaging said outgoing message in outgoing information packets suitable for transmission over said network, and means for transmitting said outgoing information packets over said network.

25. Apparatus according to claim 23, for use further with a second data network, said network controller being coupleable further to said second network, wherein said first class of messages comprises messages to be routed to a destination reachable over said second network, and wherein said means in said network controller for detecting and satisfying requests in said first class comprises means for detecting that one of said certain packets includes a request to route a message contained in said one of said certain packets to a destination reachable over said second network, and means for transmitting said message over said second network.

26. Apparatus according to claim 23, for use further with a third data network, said network controller further comprising means in said network controller for detecting particular messages in said incoming information packets to be routed to a destination reachable over said third network, said apparatus further comprising:
   a second network controller coupled to said interchange bus and coupleable to said third data network;
   means for delivering said particular messages to said second network controller over said interchange bus, substantially without involving said host computer; and
   means in said second network controller for transmitting said message contained in said particular requests over said third network, substantially without involving said host computer.

27. Apparatus according to claim 23, for use further with a mass storage device, further comprising a data control unit coupleable to said mass storage device,
   said network controller further comprising means in said network controller for detecting ones of said incoming information packets containing remote calls to procedures for managing a file system in said mass storage device, and means in said network controller for assembling said remote calls from said incoming packets into assembled calls, substantially without involving said host computer,
   said apparatus further comprising means for delivering said assembled file system calls to said data control unit over said interchange bus substantially without involving said host computer,
   and said data control unit comprising means in said data control unit for executing file system procedures on said mass storage device in response to said assembled file system calls, substantially without involving said host computer.

28. Apparatus according to claim 23, wherein said network controller comprises:
   a microprocessor;
   a local instruction memory containing local instruction code;
   a local bus coupled between said microprocessor and said local instruction memory;
   bus interface means for interfacing said microprocessor with said interchange bus at times determined by said microprocessor in response to said local instruction code; and
   network interface means for interfacing said microprocessor with said data network,
   said local instruction memory including all instruction code necessary for said microprocessor to perform said function of detecting and satisfying requests in said first class of requests.

29. Apparatus for use with a data network and a mass storage device, comprising the combination of first and second processing units,
   said first processing unit processing all requests from said network which are addressed to said apparatus and which are within a predefined non-NFS class of requests,
   and said second processing unit being coupleable to said network and to said mass storage device and decoding all NFS requests from said network which are addressed to said apparatus, performing procedures for satisfying said NFS requests, and encoding NFS reply messages for return transmission on said network, said second processing unit not satisfying any of said requests from said network which are addressed to said apparatus and which are within said predefined non-NFS class of requests.

30. Apparatus according to claim 29, wherein said predefined non-NFS class of requests includes all requests to perform client-defined procedures on said combination.

31. Apparatus according to claim 29, wherein said first processing unit includes a UNIX kernel and wherein said second processing unit does not include a UNIX kernel.

32. Apparatus according to claim 29, wherein said second processing unit comprises:
   a network control unit coupleable to said network;
   a data control unit coupleable to said mass storage device;
   a buffer memory;
   means in said network control unit for decoding said NFS requests and for encoding said NFS reply messages;
   means for transmitting to said data control unit requests responsive to NFS requests from said network to store specified data from said network on said mass storage device;

means for transmitting said specified storage data from said network to said buffer memory and from said buffer memory to said data control unit;

means for transmitting to said data control unit requests responsive to NFS requests from said network to retrieve specified retrieval data from said mass storage device to said network;

means for transmitting said specified retrieval data from said data control unit to said buffer memory and from said buffer memory to said network.

33. A network file server for use with a data network and a mass storage device, said network file server including a first unit comprising:

means for decoding NFS requests from said network;

means for performing procedures for satisfying said NFS requests, including accessing said mass storage device if required; and means for encoding any NFS reply messages for return transmission on said network, said first unit lacking means in said first unit for executing any programs which make UNIX operating system calls.

34. A network file server according to claim 33, further including a second unit comprising means for executing programs which make UNIX operating system calls.

35. A network file server for use with a data network and a mass storage device, said network file server including a first unit comprising:

means for decoding NFS requests from said network;

means for performing procedures for satisfying said NFS requests, including accessing said mass storage device if required; and means for encoding any NFS reply messages for return transmission on said network, said first unit lacking any UNIX kernel.

36. A network file server according to claim 35, further including a second unit running a UNIX kernel.

37. A network file server unit for use with a data network and a mass storage device, said network file server unit comprising:

means for decoding NFS requests from said network;

means for performing procedures for satisfying said NFS requests, including accessing said mass storage device if required; and means for encoding any NFS reply messages for return transmission on said network, said first unit lacking any UNIX application programs running on said first unit.

38. A network file server according to claim 37, further including a second unit running a UNIX application program.

* * * * *

Disclaimer 5,355,453 — Edward J. Row, Mountain View; Laurence B. Boucher, Saratoga; William M. Pitts, Los Altos; Stephen E. Blightman, San Jose, all of Calif. PARALLEL I/O NETWORK FILE SERVER ARCHITECTURE. Patent dated October 11, 1994. Disclaimer filed May 27, 1997, by the assignee, Auspex Systems, Inc.
  Hereby enter this disclaimer to claims 33, 35, and 37 of said patent.
*(Official Gazette, April 22, 2003)*